US005714975A

United States Patent [19]

Spackman

[11] Patent Number: 5,714,975
[45] Date of Patent: Feb. 3, 1998

[54] APPARATUS AND METHOD FOR GENERATING HALFTONING OR DITHER VALUES

[75] Inventor: John Neil Spackman, Guildford, England

[73] Assignee: Canon Kabushiki Kaisha, Tokyo, Japan

[21] Appl. No.: 454,819

[22] Filed: May 31, 1995

[51] Int. Cl.⁶ .................................................. G09G 5/10
[52] U.S. Cl. ................................................ 345/149; 358/457
[58] Field of Search ............................. 345/147, 149; 358/456, 457; 348/574

[56] References Cited

U.S. PATENT DOCUMENTS

| 5,341,464 | 8/1994 | Friedman et al. | 395/131 |
| 5,495,346 | 2/1996 | Choi et al. | 358/457 |
| 5,535,020 | 7/1996 | Ulichney | 358/457 |

FOREIGN PATENT DOCUMENTS

| WO 91-18382 | 11/1991 | WIPO | G09G 1/28 |

OTHER PUBLICATIONS

"Computer Graphics Principles and Practice" by Foley, Van Dam, Feiner and Hughes, 2nd edition, Addison-Wesley Publishing Company, ISBN 0-201-12110-7, pp. 568 to 573, 599 and 600, 1990.

"The Art of Electronics" by Horowitz and Hill, 2nd edition, Cambridge Univ. Press, ISBN 0-521-37095-7, pp. 674 and 675, 1989.

"Graphics Gems" edited by Glassner, Academic Press Ltd., ISBN 0-12-286166-3, pp. 176 to 178, 1990.

"Interactive Computer Graphics: Functional, Procedural and Device-Level Methods" by Burger and Gillies, Addison-Wesley Publishing Company, ISBN 0-201-17439-1, pp. 122 to 134 and 468-472, 1989.

Primary Examiner—Jeffery Brier
Attorney, Agent, or Firm—Fitzpatrick, Cella, Harper & Scinto

[57] ABSTRACT

In an image-data processing apparatus, halftoning or dither values are generated by performing operations on initial "seed" values. In one example, this is done within the registers in the central processing unit, thereby avoiding the need for repetitive, and time consuming, access to a memory external to the central processing unit.

74 Claims, 20 Drawing Sheets

FIG.5A $$D^{(n)} = \begin{bmatrix} 4D^{(n/2)} + D_{00}^{(2)}U^{(n/2)} & ; & 4D^{(n/2)} + D_{01}^{(2)}U^{(n/2)} \\ 4D^{(n/2)} + D_{10}^{(2)}U^{(n/2)} & ; & 4D^{(n/2)} + D_{11}^{(2)}U^{(n/2)} \end{bmatrix}$$

FIG.5B $$D^{(2)} = \begin{bmatrix} 0 & 2 \\ 3 & 1 \end{bmatrix}$$

FIG.5C $$U^{(n)} = \begin{bmatrix} 1 & 1 & 1 & \cdots & 1 \\ 1 & 1 & 1 & \cdots & 1 \\ 1 & 1 & 1 & \cdots & 1 \\ \vdots & \vdots & \vdots & & \vdots \\ 1 & 1 & 1 & \cdots & 1 \end{bmatrix}$$

FIG. 6

$$\begin{bmatrix}
\overset{V2}{0} & \overset{V3}{32} & \overset{V5}{8} & \overset{V28}{40} & 2 & 34 & 10 & \overset{V7}{42} \\
48 & 16 & 56 & 24 & 50 & 18 & 58 & 26 \\
12 & 44 & 4 & 36 & 14 & 46 & 6 & 38 \\
60 & 28 & 52 & 20 & 62 & 30 & 54 & 22 \\
3 & 35 & 11 & 43 & 1 & 33 & 9 & 41 \\
51 & 19 & 59 & 27 & 49 & 17 & 57 & 25 \\
15 & 47 & 7 & 39 & 13 & 45 & 5 & 37 \\
63 & 31 & 55 & 23 & 61 & 29 & 53 & 21 \\
\underset{V10}{} & \underset{V22}{} & & & & & \underset{V9}{} & \underset{100}{}
\end{bmatrix}$$

| A | B | A^B |
|---|---|-----|
| 0 | 0 | 0 |
| 0 | 1 | 1 |
| 1 | 0 | 1 |
| 1 | 1 | 0 |

FIG. 10A $$\begin{bmatrix}
\overset{V1}{32} & \overset{V4}{40} & \overset{V27}{32} & 42 & 32 & 40 & 32 & \overset{V6}{42} \\
32 & 40 & 32 & 42 & 32 & 40 & 32 & 42 \\
32 & 40 & 32 & 42 & 32 & 40 & 32 & 42 \\
32 & 40 & 32 & 42 & 32 & 40 & 32 & 42 \\
32 & 40 & 32 & 42 & 32 & 40 & 32 & 42 \\
32 & 40 & 32 & 42 & 32 & 40 & 32 & 42 \\
32 & 40 & 32 & 42 & 32 & 40 & 32 & 42 \\
\underset{V13}{32} & \underset{V21}{40} & 32 & 42 & 32 & 40 & 32 & \underset{V8}{42}
\end{bmatrix}$$

FIG. 10B $$\begin{bmatrix}
\overset{V11}{8} & 8 & 10 & \overset{V26}{10} & 8 & 8 & 10 & 10 \\
8 & 8 & 10 & 10 & 8 & 8 & 10 & 10 \\
8 & 8 & 10 & 10 & 8 & 8 & 10 & 10 \\
8 & 8 & 10 & 10 & 8 & 8 & 10 & 10 \\
8 & 8 & 10 & 10 & 8 & 8 & 10 & 10 \\
8 & 8 & 10 & 10 & 8 & 8 & 10 & 10 \\
8 & 8 & 10 & 10 & 8 & 8 & 10 & 10 \\
\underset{V20}{8} & 8 & 10 & 10 & 8 & 8 & 10 & \underset{V12}{10}
\end{bmatrix}$$

FIG. 10C $$\begin{bmatrix} 0 & 2 & 0 & 2 & 0 & 2 & 0 & 2 \\ 0 & 2 & 0 & 2 & 0 & 2 & 0 & 2 \\ 0 & 2 & 0 & 2 & 0 & 2 & 0 & 2 \\ 0 & 2 & 0 & 2 & 0 & 2 & 0 & 2 \\ 0 & 2 & 0 & 2 & 0 & 2 & 0 & 2 \\ 0 & 2 & 0 & 2 & 0 & 2 & 0 & 2 \\ 0 & 2 & 0 & 2 & 0 & 2 & 0 & 2 \\ 0 & 2 & 0 & 2 & 0 & 2 & 0 & 2 \end{bmatrix}$$

V16 (top-left), V25 (top, fourth column), V19 (bottom-left)

FIG. 10D $$\begin{bmatrix} 2 & 2 & 2 & 2 & 2 & 2 & 2 & 2 \\ 2 & 2 & 2 & 2 & 2 & 2 & 2 & 2 \\ 2 & 2 & 2 & 2 & 2 & 2 & 2 & 2 \\ 2 & 2 & 2 & 2 & 2 & 2 & 2 & 2 \\ 2 & 2 & 2 & 2 & 2 & 2 & 2 & 2 \\ 2 & 2 & 2 & 2 & 2 & 2 & 2 & 2 \\ 2 & 2 & 2 & 2 & 2 & 2 & 2 & 2 \\ 2 & 2 & 2 & 2 & 2 & 2 & 2 & 2 \end{bmatrix}$$

V15 (top-left), V24 (top, fourth column), V18 (bottom-left)

FIG. 10E $$\begin{bmatrix} 0^{V14} & 0 & 0 & 0^{V23} & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0_{V17} & 0 & 0 & 0 & 0 & 0 & 0 & 0 \end{bmatrix}$$

FIG. 13

| | | | | | | |
|---|---|---|---|---|---|---|
| SEED FOR ROW 1: | 0 | 2 | 0 | 8 | 32 | 0 |
| SEED FOR ROW 2: | 0 | 2 | 0 | 8 | 32 | 48 |
| SEED FOR ROW 3: | 0 | 2 | 0 | 8 | 32 | 12 |
| SEED FOR ROW 4: | 0 | 2 | 0 | 8 | 32 | 60 |
| SEED FOR ROW 5: | 0 | 2 | 0 | 8 | 32 | 3 |
| SEED FOR ROW 6: | 0 | 2 | 0 | 8 | 32 | 51 |
| SEED FOR ROW 7: | 0 | 2 | 0 | 8 | 32 | 15 |
| SEED FOR ROW 8: | 0 | 2 | 0 | 8 | 32 | 63 |

FIG. 18

| | | | | | | |
|---|---|---|---|---|---|---|
| LOAD | 0 | 2 | 0 | 8 | 32 | [0] ← 130,132 |
| SHIFT | 0 | 0 | 2 | 0 | 8 | 32 ← 134 |
| XOR | 0 | 2 | 2 | 8 | 40 | [32] ← 136,132 |
| SHIFT | 0 | 0 | 2 | 2 | 8 | 40 ← 134 |
| XOR | 0 | 2 | 0 | 10 | 32 | [8] ← 136,132 |
| SHIFT | 0 | 0 | 2 | 0 | 10 | 32 |
| XOR | 0 | 2 | 2 | 10 | 42 | [40] |
| SHIFT | 0 | 0 | 2 | 2 | 10 | 42 |
| XOR | 0 | 2 | 0 | 8 | 32 | [2] |
| SHIFT | 0 | 0 | 2 | 0 | 8 | 32 |
| XOR | 0 | 2 | 2 | 8 | 40 | [34] |
| SHIFT | 0 | 0 | 2 | 2 | 8 | 40 |
| XOR | 0 | 2 | 0 | 10 | 32 | [10] |
| SHIFT | 0 | 0 | 2 | 0 | 10 | 32 |
| XOR | 0 | 2 | 2 | 10 | 42 | [42] |
| SHIFT | 0 | 0 | 2 | 2 | 10 | 42 |
| XOR | 0 | 2 | 0 | 8 | 32 | [0] |

$$\begin{bmatrix} 0 & 36 & 4 & 32 & 18 & 54 & 22 & 50 \\ 2 & 38 & 6 & 34 & 16 & 52 & 20 & 48 \\ 9 & 45 & 13 & 41 & 27 & 63 & 31 & 59 \\ 11 & 47 & 15 & 43 & 25 & 61 & 29 & 57 \\ 1 & 37 & 5 & 33 & 19 & 55 & 23 & 51 \\ 3 & 39 & 7 & 35 & 17 & 53 & 21 & 49 \\ 8 & 44 & 12 & 40 & 26 & 62 & 30 & 58 \\ 10 & 46 & 14 & 42 & 24 & 60 & 28 & 56 \end{bmatrix}$$ FIG. 20

$$\begin{bmatrix} 0 & 34 & 2 & 32 & 17 & 51 & 19 & 49 \\ 1 & 35 & 3 & 33 & 16 & 50 & 18 & 48 \\ 12 & 46 & 14 & 44 & 29 & 63 & 31 & 61 \\ 13 & 47 & 15 & 45 & 28 & 62 & 30 & 60 \\ 4 & 38 & 6 & 36 & 21 & 55 & 23 & 53 \\ 5 & 39 & 7 & 37 & 20 & 54 & 22 & 52 \\ 8 & 42 & 10 & 40 & 25 & 59 & 27 & 57 \\ 9 & 43 & 11 & 41 & 24 & 58 & 26 & 56 \end{bmatrix}$$ FIG. 21

$$\begin{bmatrix} 0 & 6 & 9 & 15 \\ 11 & 13 & 2 & 4 \\ 7 & 1 & 14 & 8 \\ 12 & 10 & 5 & 3 \end{bmatrix}$$ FIG. 22

APPARATUS AND METHOD FOR GENERATING HALFTONING OR DITHER VALUES

BACKGROUND OF THE INVENTION

1. Field of the Invention

The present invention generally relates to an apparatus and method for producing halftoning or dither values. More particularly, it is directed to an image processing apparatus and method for producing halftoning or dither values with particular application in computer graphics.

2. Description of Prior Art

The principles and applications of halftoning and dithering are described for example in "Computer Graphics Principles and Practice" by Foley, van Dam, Feiner and Hughes, second edition, Addison-Wesley Publishing Company, ISBN 0-201-12110-7. A more detailed textbook on the subject is "Digital Halftoning" by Robert Ulichney, MIT Press 1987, ISBN 0-262-21009-6.

As is well known to persons skilled in the art, halftoning and ordered dithering are techniques for reducing high-precision data to a lower precision using positional information to reduce the apparent loss of information content (ie trading spatial resolution for resolution in another attribute, eg intensity or colour).

In the context of image processing, the techniques can be used, for example, to reduce multi-level grey scale images to fewer levels (in the simplest case, to black and white), while retaining the visual impression of the grey scale image. This has the advantages that the multi-level grey scale image data can then be displayed on a low-bit display, and that the storage space required for the image data is reduced. The techniques can also be used for other purposes in image processing, such as the reduction of multi-bit colour image data for display on a low-bit display.

When performing halftoning and ordered dithering techniques, a matrix of values is laid down periodically over the pixels of the image. In halftoning, the average intensity of the pixels over the entire area of the matrix is then used to determine the number of pixels which will be illuminated within the matrix in the displayed image, the positions of the pixels to be illuminated being determined by the values in the matrix (assuming black/white output only). In ordered dithering, if multi-level data is to be reduced to 2-level data (for a binary display), the value of each pixel (representing intensity, colour etc) is compared with the matrix value corresponding to that pixel, and the pixel is set to one of the 2 values (eg "ON") in the final displayed image if the pixel value is greater than or equal to the matrix value, while it is set to the other value (eg "OFF") if the pixel value is less than the matrix value. More generally, when using ordered dithering to reduce multi-level data to data having less levels, for display on a low-bit display, each pixel value is added to the corresponding matrix value, and the resultant value is then quantised for display. This has the effect that displayed pixel values then vary locally in dependence upon the dither values added, resulting in the reduction of "contours", which can occur in a quantised display where intensities (or colours) jump from one discrete value to another, and ensuring an average intensity or colour over the dithered region.

In known image processing apparatuses with dedicated dithering or halftoning hardware, a special look-up memory is provided with the matrix of dither values prestored. These can be addressed automatically in accordance with hardware pixel addresses, as the output pixel values are generated and written to a frame memory, or direct to screen or printer. High performance can be achieved, but the need for the special look-up memory increases the cost of the apparatus.

Moreover, in known lower-cost image processing apparatuses, without dedicated image processing hardware, the matrices of values required for halftoning or dithering are stored in advance in a part of general-purpose memory having sufficient capacity to store all of the required numbers, such as RAM or ROM connected to the central processing unit of the apparatus. When it is desired to perform a halftoning or dithering operation, the central processing unit under program control reads the values from the memory and performs the necessary operations on these values and the image pixel values. In such an apparatus, the time taken to perform halftoning or dithering operations is relatively long, especially because the processor must read the matrix values from memory, an operation which must be performed many times since it is required to be done for each pixel every time a display is generated and/or updated. Frequently in image synthesis, the reading of the dither value from memory is the only memory access required per pixel, and therefore constitutes a real obstacle to improved performance using general purpose computer hardware.

Since, as explained above, the matrix is laid down periodically over the pixels, in practice a given row of the matrix is repeatedly used until the end of a display line or pixel span is reached, the next row of the matrix then being used for the next display line, and so on. Accordingly, one way to address the problem of the large number of external memory accesses in the systems described above might be to use a hardware register having sufficient capacity to allow the matrix values for one line of a display to be stored therein and read out in a repetitive sequence. To generate a matrix value in such a system, the last number in the memory would be read and all of the values might be shifted along in a circular shift-register manner, with the used value being returned to the start. In this way, the values for a whole display line could be produced by "recycling" the values in the matrix row. In a case where a matrix of size 8×8 values were to be used, with each value being a 6 bit digital number (to give a range of 64 dither values), a special register of capacity 48 bits (8 values×6 bits) would be required to store one row of matrix values. A standard 32-bit CPU register could not therefore be employed to store the whole row, and either more complex software, a purpose-built CPU with a special 48-bit register, or a full 64-bit CPU is required, increasing apparatus cost and complexity.

An introduction to the structure and operation of popular microprocessors and memories may be found for example in "The Art of Electronics" by Horowitz and Hill, second edition, Cambridge University Press, ISBN 0-521-37095-7, while the skilled reader may also be familiar with more up-to-date processors which can also be used to implement the invention.

BRIEF SUMMARY OF THE INVENTION

It is an object of the present invention to improve the apparatuses described above.

In one aspect, the invention comprises an image processing apparatus or method for generating a sequence of halftoning and/or dither values incrementally using a mathematical relationship between the values (rather than by table look-up).

In a second aspect, the invention comprises an apparatus or method for generating halftoning and/or dither values sequentially from an initial "seed" word. In one embodiment, each value is generated by performing a SHIFT operation and an XOR operation.

In another aspect, the invention comprises an image processing apparatus or method in which the values for halftoning or dithering are generated in a register in the central processing unit, thereby avoiding the need for memory access per pixel, and without incurring the need for a relatively high capacity register.

BRIEF DESCRIPTION OF THE DRAWINGS

Embodiments of the invention will now be described by way of example, in conjunction with the accompanying drawings, in which:

FIG. 5A,5B and 5C give the mathematical equations for values in a Bayer matrix used in an embodiment of the invention.

FIG. 6 shows an 8×8 Bayer matrix used in an embodiment of the invention.

FIG. 10A to illustrate the horizontal relationship between the numbers in the 8×8 Bayer matrix used in an embodiment of the invention.

FIG. 13 gives the input "seed" values used in an embodiment of the invention for each row of the Bayer matrix (for a starting pixel column which is a multiple of 8).

FIG. 18 illustrates the steps by which values in a row of the Bayer matrix can be generated in an embodiment of the invention using a CPU register.

FIG. 20 gives a first example of a different matrix which can be generated in an embodiment of the invention.

FIG. 21 gives a second example of a different matrix which can be generated in an embodiment of the invention.

FIG. 22 gives a third example of a different matrix which can be generated in an embodiment of the invention.

DETAILED DESCRIPTION OF EXEMPLARY EMBODIMENTS

Figure 1:
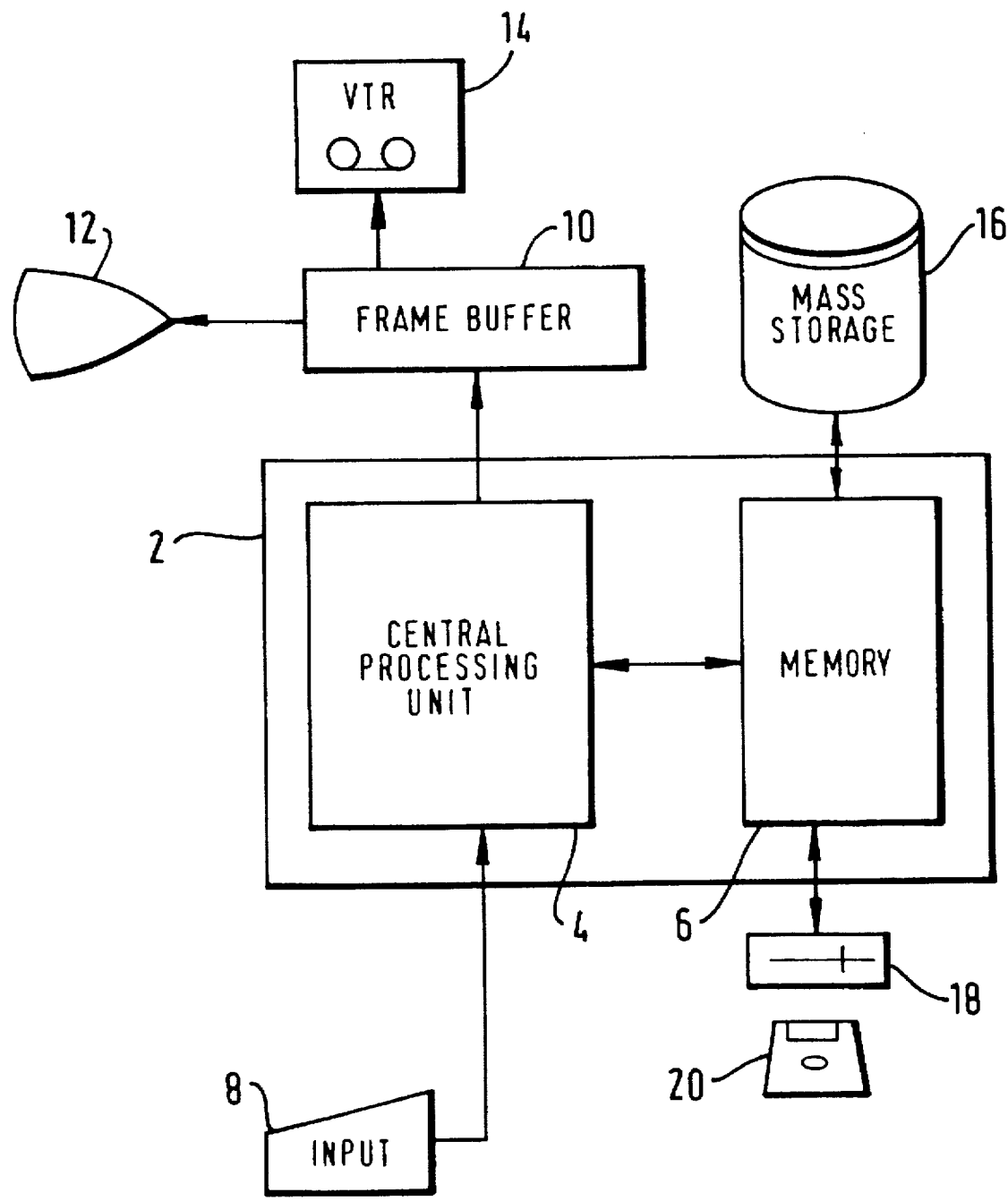
FIG. 1 is a block diagram showing the general arrangement of an image processing apparatus according to an embodiment of the invention.

FIG. 1 is a block diagram showing the general arrangement of an image processing apparatus according to a first embodiment. In the apparatus, there is provided a computer 2, which comprises a central processing unit 4 connected to a memory 6 operable to store a program defining the sequence of operations of the central processing unit 4, and to store object and image data used in calculations by the central processing unit 4.

Coupled to an input port of the central processing unit 4 there is an input device 8, which may comprise, for example, a keyboard and/or a position sensitive input device such as a mouse, tracker-ball, or a digitizer tablet and stylus etc.

Also coupled to the central processing unit 4 is a frame buffer 10 which comprises a memory unit arranged to store image data relating to at least one image, for example by providing one (or several) memory location(s) per pixel of the image. The value stored in the frame buffer for each pixel defines the colour or intensity of that pixel in the image.

Images are generally two-dimensional arrays of pixels, and are conveniently described in terms of cartesian coordinates, so that the position of a given pixel can be described by a pair of x-y coordinates. This representation is convenient when, for example, the image is to be displayed on a raster scan display since the x coordinate maps to the distance along a line of the display, and the y coordinate maps to the number of the line. The frame buffer 10 has sufficient memory capacity to store at least one image. For example, for an image having a resolution of 1000×1000 pixels, the frame buffer 10 includes $10^6$ pixel locations, each addressable directly or indirectly in terms of pixel coordinates x,y.

Coupled to the frame buffer 10 is a display unit 12 for displaying the image stored in the frame buffer 10 in a conventional manner. Also coupled to the frame buffer 10 is a video tape recorder (VTR) 14 or other image recording device, such as a paper printer or 35 mm film recorder.

Coupled to the memory 6 (typically via the central processing unit 4), and possibly also to the frame buffer 10, is a mass storage device 16, such as a hard disc drive, having a high data storage capacity. Also coupled to the memory 6 is a disc drive 18 which is operable to accept removable data storage media, such as a floppy disc 20, and to transfer data stored thereon to the memory 6.

The central processing unit 4, memory 6, frame buffer 10, display unit 12 and mass storage device 16 may be commercially available as a complete system, for example as a personal computer (PC) or a workstation such as the SparcStation available from Sun Microsystems.

Embodiments of the invention can be supplied commercially in the form of programs stored on a floppy disc 20 or other medium, or signals transmitted over a data link, so that the receiving hardware becomes re-configured into an apparatus embodying the invention. As will be seen, the invention allows technically improved performance to be achieved than was hitherto possible with a given type of computer hardware.

Figure 2:
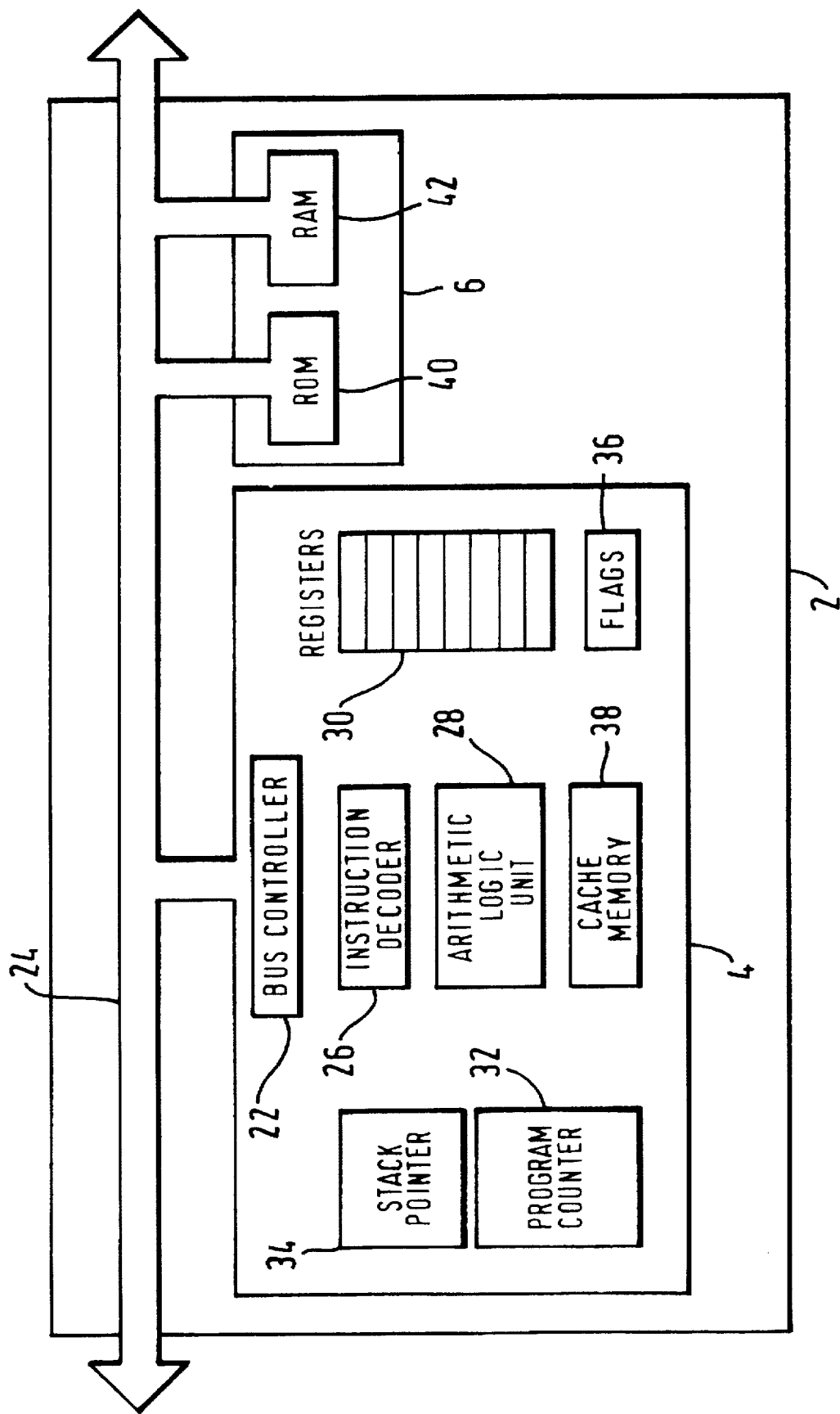
FIG. 2 illustrates the configuration of the computer's central processing unit (CPU) and memory in an embodiment of the invention.

FIG. 2 is a block diagram illustrating in more detail the configuration of the central processing unit (CPU) 4 and memory 6 within the computer 2. The central processing unit 4 comprises the following elements:

Bus controller 22 for controlling interface of the central processing unit 4 with the other components of the apparatus via a data bus 24.

Instruction decoder 26 for decoding instructions received from memory 6.

Arithmetic logic unit 28 for carrying out operations on values contained in the registers 30, in accordance with instructions received from the memory 6.

Program counter 32 for keeping track of the processor's present position within the stored program.

Stack pointer 34 for keeping track of the current top of a "stack" within memory.

Flag registers 36 for noting states such as carries, zeros, and signs.

Cache memory 38 for storing values recently fetched from memory to allow quicker access by the processor.

The memory 6 comprises read only memory (ROM) 40 and random access memory (RAM) 42.

These elements are well-known in the field of microprocessor technology, and are described in more detail in the Horowitz and Hill reference referred to above.

The overall operation of the apparatus will now be described. By way of an example application, an embodiment used for 3-dimensional computer graphics will be described.

Figure 3:
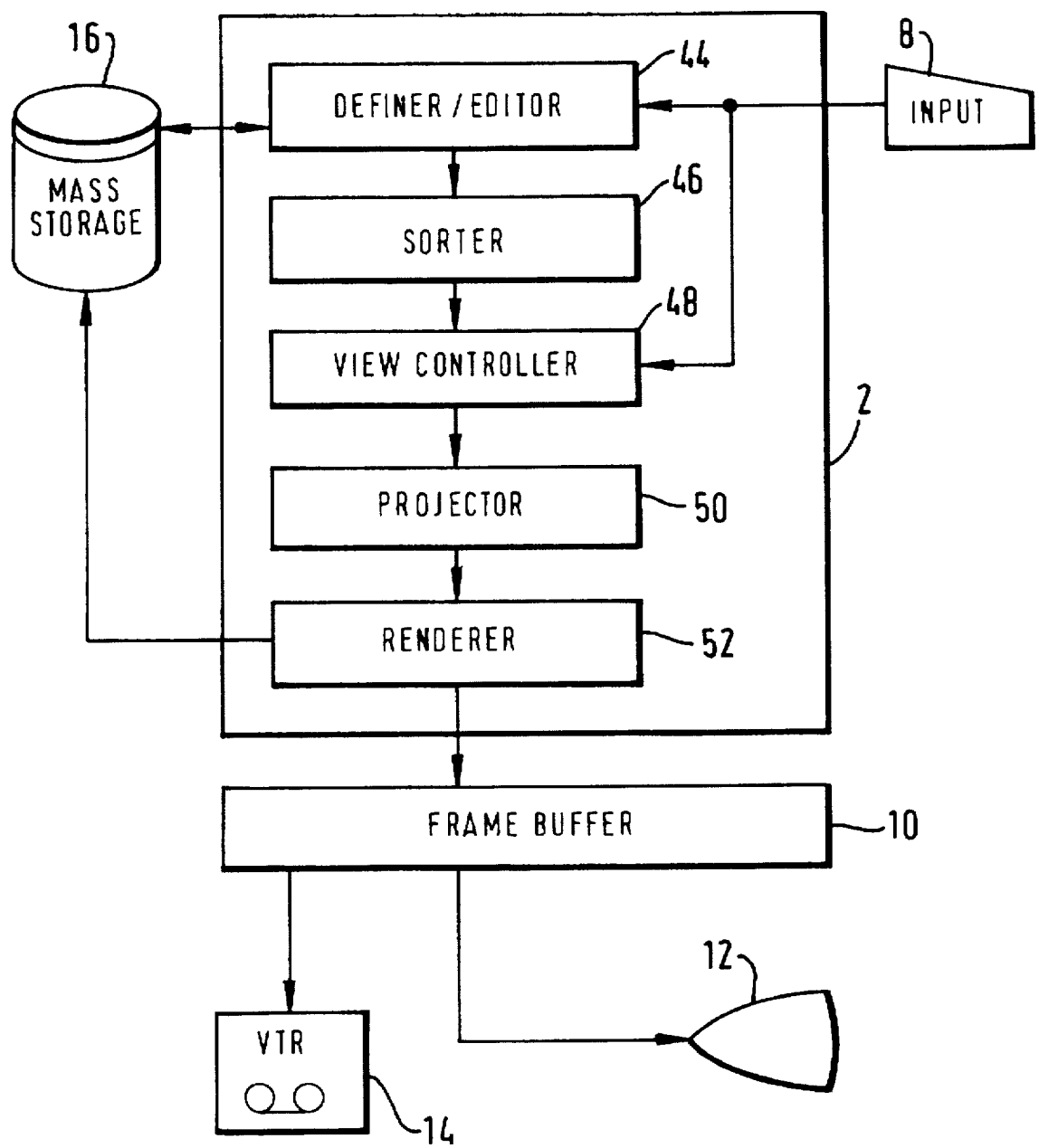
FIG. 3 schematically illustrates the operations performed by the computer in an embodiment of the invention.

With reference to FIG. 3, the computer 2 performs a number of different operations at different times, executing corresponding stored programs within the memory 6, and therefore provides means 44 to 52 for performing such operations. These means are illustratively shown in FIG. 3 as separate, although in the present embodiment, all are performed by the central processing unit 4 in cooperation with the memory 6. It will be understood, however, that separate processors or dedicated logic circuits, operatively connected, could be provided to execute each function.

The embodiment may thus be considered as comprising, firstly, a definer or editor 44 arranged to define the shape of a two- or three-dimensional object and likewise, optionally, to edit the object. The definer/editor 44 is connected to the mass storage device 16 to enable an object, once defined, to be stored for subsequent use. The definer/editor 44 is also connected to the input device 8 to enable an operator to input and/or change the object. In the present embodiment, the data defining an object is data representing control points or vertices of a plurality of surfaces (for example polygons) making up the object.

Sorter 46 is provided for performing an initial operation of sorting the surfaces or regions of the object into an order which determines the order in which they will be drawn (i.e. rendered into the frame buffer 10) so as to draw last those regions which are intended to occlude others. The sorter 46 reads the object data defined by the definer/editor 44 and generates a corresponding sorted list of regions for subsequent use.

The appearance of the 3-D object on the two dimensional screen of the display unit 12, and consequently the image data stored in the frame buffer 10, is dependent upon the notional view direction from which the object is to be viewed. It may also be dependent upon the distance between the object and a notional viewpoint corresponding to the plane of the screen of the display unit 12. View controller 48 is therefore provided for enabling an operator to define a view direction, or a view direction and a distance (for example, by defining the coordinates of a viewpoint and/or view direction), via the input device 8. Rather than defining individual viewpoints one at a time, the input means 8 may be employed to define a trajectory of successive viewpoints or viewing directions, for example by specifying a direction of movement and speed.

Projector 50 is provided to perform a projection of the, or each, three dimensional object into the two dimensional viewing plane.

Each two dimensional viewing plane region projected by the projector 50 is then rendered, in the order previously defined by the sorter 46, by a renderer 52 which fills the region (that is, allocates an appropriate colour or grey scale value to each pixel location in the frame buffer 10 which lies within the region). In performing the rendering operation, the renderer 52 is arranged to test each region to determine which direction in the projected plane it is facing, since only regions which face outwardly of the object ("forward facing") need to be rendered. In addition, the renderer 52 performs halftoning and/or dithering when writing the pixel values into the frame buffer 10, as will now be described.

Figure 4:
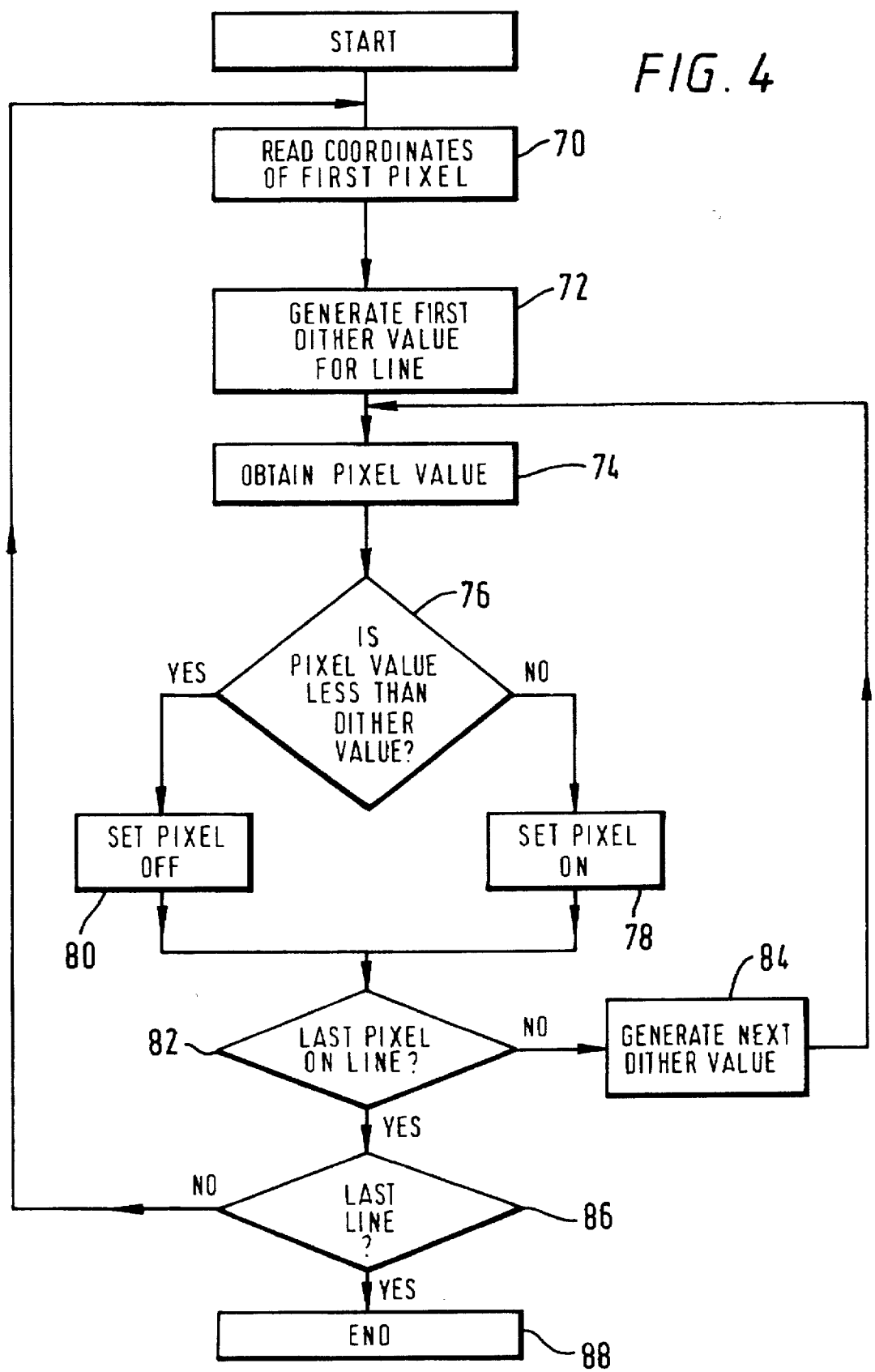
FIG. 4 shows the steps in an ordered dithering operation to reduce multi-intensity-level image data to binary display data in an embodiment of the invention.

Taking as a first example the use of ordered dithering to reduce multi-intensity-level image data to binary (black/white) display data, FIG. 4 shows the process by which this is performed in the present embodiment. At step 70, the renderer 52 reads the coordinates of the first pixel in the image area which is to be subjected to the dithering operation. At step 72, the first dither value is generated, in a manner to be described in more detail below. At step 74, the intensity value of the first pixel is read from memory or generated by calculation within the central processing unit 4. At step 76, the pixel value obtained at step 74 and the dither value obtained at step 72 are compared. If the pixel value is greater than, or equal to, the dither value, the pixel is set to an "ON" state at step 78, while if the pixel value is less than the dither value the pixel is set to an "OFF" state at step 80. At step 82, a check is made as to whether the pixel just processed is the last pixel to be subjected to the dithering process on a display line. If the pixel is not the last pixel, then the next dither value is generated at step 84 and the process returns to step 74 where the value of the next pixel is obtained.

Steps 74 to 84 are therefore repeated for each pixel of a "span", being a series of pixels to be subjected to dithering on a given display line. At the end of a "span", the process proceeds to step 86 in which it is determined whether a line of pixels just processed is the last line in the area of the display to be subjected to the dithering process. If the line is the last line, then the process ends at step 88. If the line is not the last line, the process returns to step 70 where the coordinates of the first pixel to be subjected to dithering on the next line are read.

Steps 70 to 86 are repeated until all of the lines in the area to be rendered with dithering have been processed, and can be repeated for each additional area to be rendered.

The way in which the dither values are generated at steps 72 and 84 of the process shown in FIG. 4 will now be described.

There are many possible matrices which may be used to produce halftoning or ordered dither values. For example, a Bayer matrix may be employed, which minimises artefacts that dithering can introduce into the displayed image. FIG.

5A shows the standard mathematical equation, which is a recurrence relation, for values in the Bayer matrix. FIG. 5B and FIG. 5C give the values of $D^{(2)}$ and $U^{(n)}$ respectively, which are used in this equation. The value n in FIGS. 5A, 5B and 5C refers to the number of elements in the rows and columns of the matrix; that is, the matrix is of size n×n.

In the present embodiment, an 8×8 matrix is used to carry out dithering. Such a matrix is shown at 100 in FIG. 6, and inspection would reveal that it satisfies the equation for $D^{(8)}$ shown in FIG. 5A, and is therefore the 8×8 Bayer matrix.

Figure 7:
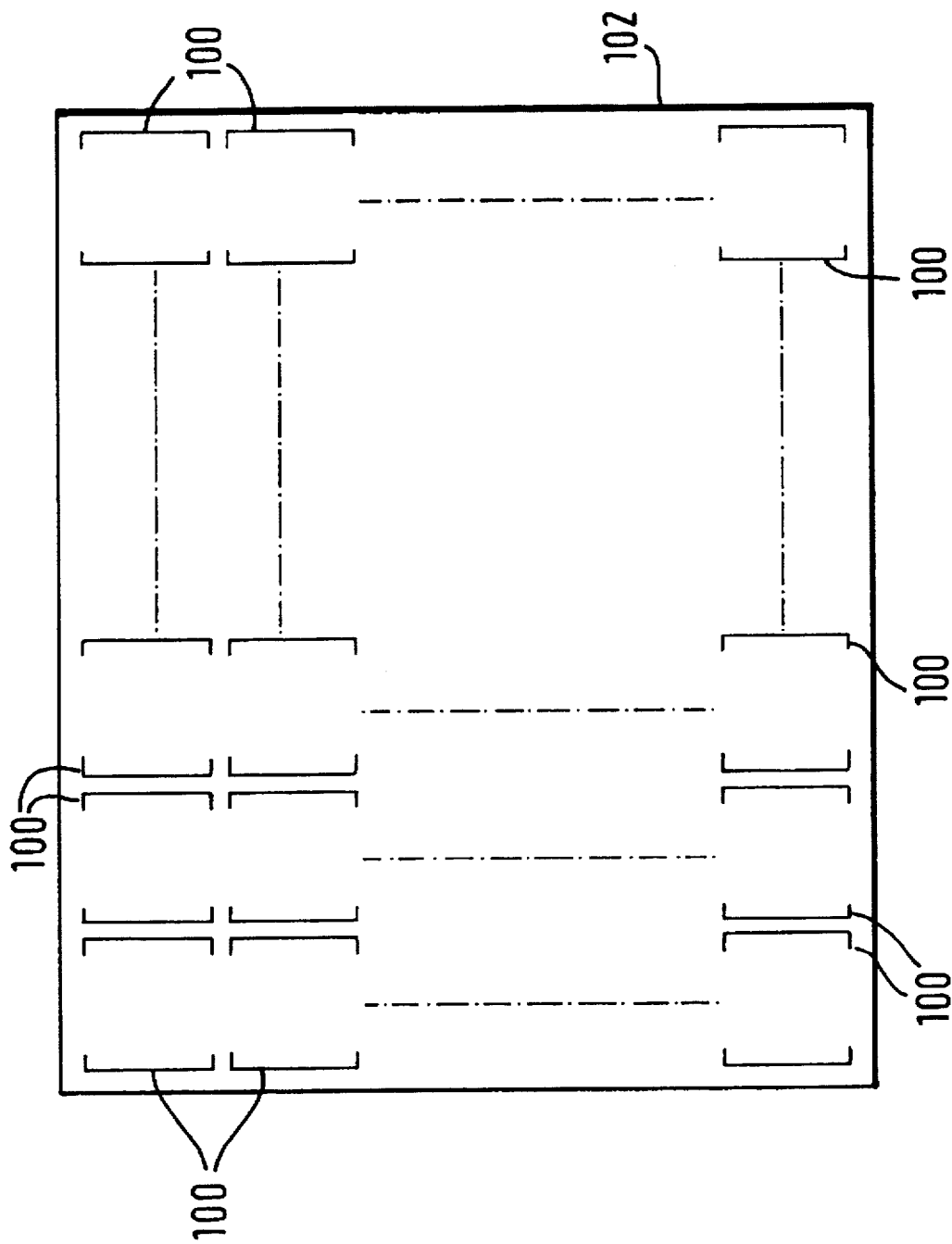
FIG. 7 illustrates the application of the dither matrix to image pixel data in an embodiment of the invention.

As is well known to persons skilled in the art, and as illustrated in FIG. 7, during dithering (or halftoning), the matrix 100 is, in effect, repeatedly placed on the image pixel data to be displayed, so as to cover the desired area of the image 102. In the present embodiment, as described above with reference to FIG. 4, this operation is performed for dithering on a pixel-by-pixel basis. That is, the values in the first row in the matrix 100 are not pre-stored, but are actually generated one-by-one as each is applied to the corresponding pixel. Values in subsequent rows of the matrix are then generated and applied to the corresponding lines of pixel data in the same way. In this way, the need to pre-store all of the values in the matrix 100 before the dithering operation can begin is avoided.

Figure 8:
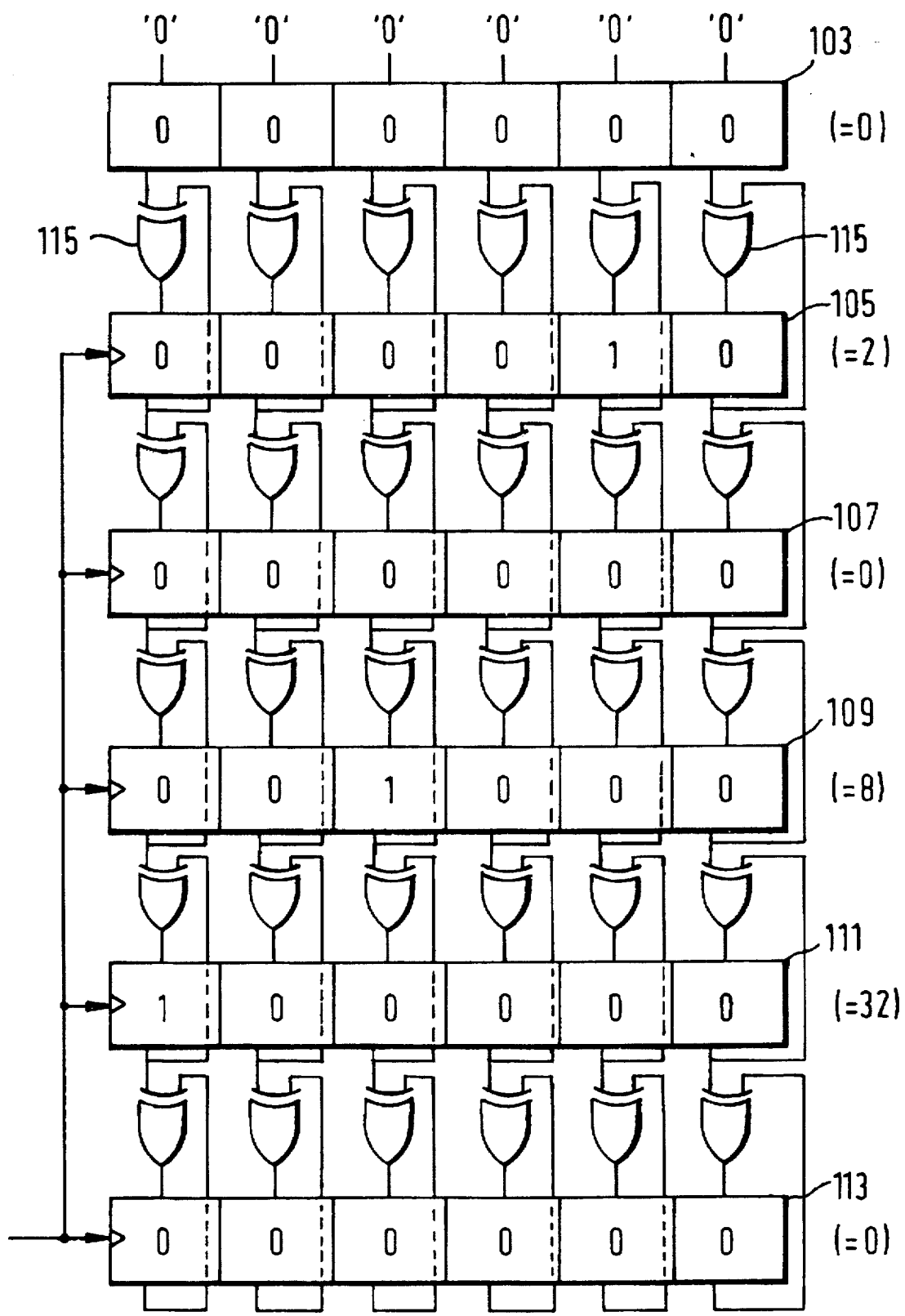
FIG. 8 shows schematically a circuit arrangement for generating the dither values at steps 72 and 84 of FIG. 4 in a first implementation of an embodiment of the invention.

FIG. 8 shows a first arrangement for generating the dither values in steps 72 and 84 of FIG. 4. This arrangement comprises six six-bit registers 103 to 113 which are interconnected via a plurality of XOR gates 115. Each bit place in a given register is connected to the corresponding bit place in the adjacent register through an XOR gate 115, such that the inputs to the XOR gate comprise the bit output from the first register and the bit output from the adjacent register, and the output of the XOR gate is input to the adjacent register, as shown in FIG. 8.

Figures 9, 11:
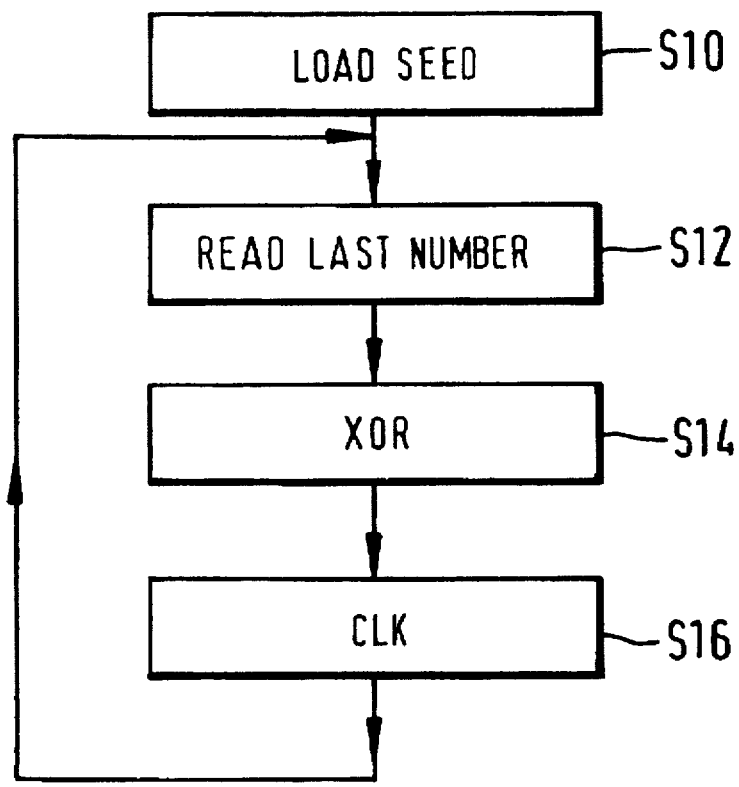
FIG. 9 shows the "truth table" for a single-bit XOR function used in an embodiment of the invention.
FIG. 11 illustrates the overall steps by which values in a dither matrix can be generated in embodiments of the invention.

FIG. 9 shows the "truth table" for an exclusive-OR (XOR) function having two binary inputs A and B. As is well known to the person skilled in the art, in this function, the output (A^B) is 1 when the two inputs A and B are different, and 0 when the applied inputs A and B are equal (that is, both 0 or both 1). Since, in the present embodiment, the values of the 8×8 dither matrix occupy the range 0–63 (FIG. 6), they can be represented as six-bit binary numbers. A "bitwise XOR" of the numbers 8 and 40 (001000 and 101000 binary), for example, therefore gives the result 32 (100000 binary).

Referring again to FIG. 8, to generate dither values, each register is loaded with a six-bit number (in this example, 000000 representing 0 is input to register 103, 000010 representing 2 is input to register 105, 000000 representing 0 is input to register 107, 001000 representing 8 is input to register 109, 100000 representing 32 is input to register 111, and 000000 representing 0 is input to register 113). Then, to obtain the first dither value for a line (step 72 in FIG. 4) the number in register 113 is read out, this number being the required first dither value.

To generate subsequent dither values for a given line (step 84 in FIG. 4) each number is clocked into the next register via the XOR gates 115, and the 6-bit number 000000 is input to the first register 103 (the bit places in register 103 being hard-wired to logic '0'). The number in the end register 113 is then read out, this being the required next dither value.

The reasons why this arrangement generates the required dither values will now be described with reference to the mathematical relationship between the values in the matrix 100.

FIGS. 10A to 10E show the effect of applying the bitwise XOR function to adjacent values in each row of the matrix 100 shown in FIG. 6. Thus, for example, the value V1 shown in FIG. 10A is the XOR of the values V2 and V3 shown in FIG. 6. Similarly, the value V4 shown in FIG. 10A is the XOR of the values V3 and V5 shown in FIG. 6. The value V6 shown in FIG. 10A is the XOR of the values V7 and V2 shown in FIG. 6 (the value V2 being used as the second input in this case since this is the value which would be present if another matrix 100 were placed alongside the existing matrix 100, as shown in FIG. 7). Likewise, the value V8 in FIG. 10A is the XOR of the values V9 and V10 in FIG. 6.

FIG. 10B shows the result of applying the XOR function to adjacent values in each row of the matrix shown in FIG. 10A. Thus, value V11 shown in FIG. 10B is the XOR of values V1 and V4 shown in FIG. 10A. Similarly, value V12 in FIG. 10B is the XOR of values V8 and V13 in FIG. 10A.

FIG. 10C shows the effect of applying the XOR function to adjacent values in each of the rows of the matrix shown in FIG. 10B. FIG. 10D shows the effect of applying the XOR function to adjacent values in each of the rows of the matrix shown in FIG. 10C, and FIG. 10E shows the effect of applying the XOR function to adjacent values in each of the rows of the matrix shown in FIG. 10D. In the matrix of FIG. 10E, all of the values are zero, and no further application of the XOR function to derive further matrices will produce any useful change.

The properties of the matrices shown in FIGS. 10A to 10E are exploited in the present embodiment of the invention to generate the values of the Bayer ordered dither matrix $D^{(8)}$ by calculation, as will now be described.

FIG. 11 illustrates the steps by which values in a halftoning or dither matrix can be generated. At step S10, a "seed" word comprising a set of six 6-bit binary numbers is loaded (in the first implementation, to the registers 103 to 113 in the arrangement shown in FIG. 8), and at step S12 the last number in the seed is read, this being the first number in the required matrix. At step S14, the number currently in each of the registers 105–113 is XOR-ed with the number currently in the preceding register (103–111 respectively), thereby to generate a new number at the input of the register. As mentioned above, the input of the first register 103 is fixed at zero. At step S16, the registers 103–113 are simultaneously clocked, so that these new numbers become the current register contents. Step S12 is then repeated to obtain the next required value in the matrix. Steps S14,S16 and S12 are repeated until all of the required values have been generated along a row of pixels.

The process illustrated in FIG. 11 will now be described further for the implementation described above with reference to the example of FIG. 12.

Figure 12:
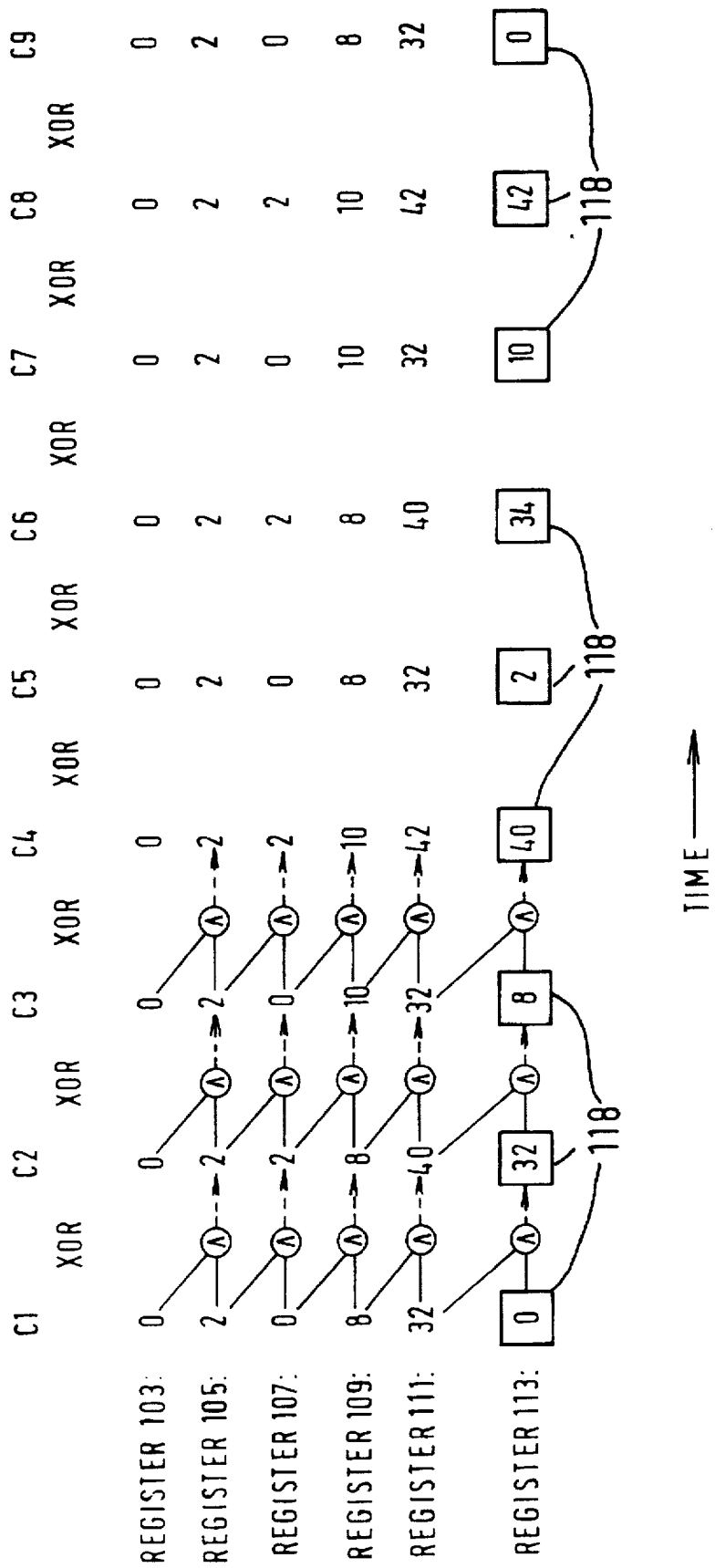
FIG. 12 illustrates the detailed steps by which values in one row of the Bayer matrix can be generated in the first implementation of an embodiment of the invention.

The first column (C1) in FIG. 12 shows the loading of a seed word having the six numbers 0-2-0-8-32-0 to registers 103 to 113 shown in FIG. 8, (which corresponds to step S10 in FIG. 11). In FIG. 12, the seed is used to generate the values in the first row of the 8×8 Bayer matrix 100 shown in FIG. 6.

The origins of this seed can be seen in the matrices shown in FIGS. 10A to 10E. More specifically, the seed can be derived by taking the first number in the first row in each of the matrices shown in FIGS. 10E, 10D, 10C, 10B, 10A and 6. That is, the numbers V14 (0), V15 (2), V16 (0), V11 (8), V1 (32), and V2 (0), are used to give the seed 0-2-0-8-32-0.

The last number of the seed, namely V2 (0), which is shown in box 118 in FIG. 12, is read out (corresponding to step S12 in FIG. 11). While the inputs to register 103 are fixed at "0", a bitwise XOR operation (indicated by "^" in FIG. 12) is performed on the numbers 2 and 0, 0 and 2, 8 and 0, 32 and 8, and 0 and 32, to provide new inputs for the registers 105–113 (this corresponds to step S16 in FIG. 11). The registers 103–113 are then clocked (step S16 in FIG. 11), as indicated by the dotted lines in FIG. 12, so that the last number (in register 113) is now 32 (column C2 in FIG. 12), and this is read out (step S12 of FIG. 11). The clocking operation (and XOR operation) are then repeatedly performed as shown in the remaining columns of FIG. 12.

The number shown in box 118 in FIG. 12 (corresponding to register 113) is the number which is read out to be used in the dithering operation. Thus, the numbers 0, 32, 8, 40, 2, 34, 10, 42 and 0 are read out. As will be apparent from a consideration of FIG. 6, these numbers are the same as the values in the first row of the matrix 100. The last number, 0, represents the first value in the first row of another matrix placed adjacent to the matrix 100, as shown in FIG. 7; the other values in the first row of this adjacent matrix can be obtained by continuing with the process of FIG. 11.

In a similar way to that described above, the values for the second, and subsequent, rows of the matrix 100 can also be generated using an input seed word derived from the matrices shown in FIGS. 10A to 10E. FIG. 13 gives the input seed value for each row of the dither matrix. Thus, for example, the seed value for row 7 of the dither matrix is derived by taking the number V17 (0) in FIG. 10E, the number V18 (2) in FIG. 10D, the number V19 (0) in FIG. 10C, the number 20 (8) in FIG. 10B, the number V21 (32) in FIG. 10A and the number V22 (15) in FIG. 6. Similarly, the process can be generalised to any column position by using an appropriate seed value, as will be described later.

In the first hardware implementation described above, six 6-bit registers were employed and six XOR gates between adjacent registers were used to perform the bitwise XOR operations described above. However, other implementations are possible.

Figure 14:
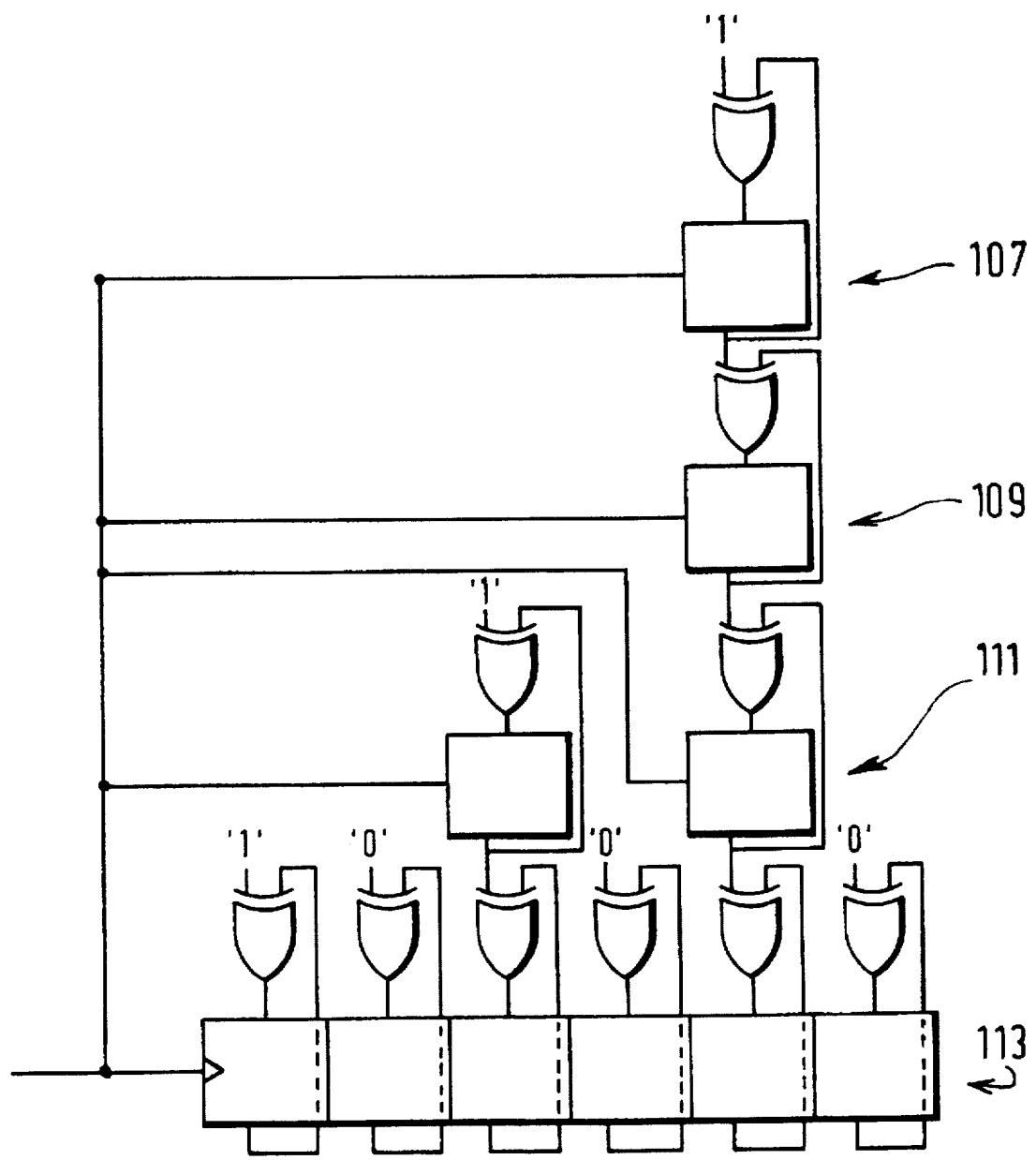
FIG. 14 shows a simplified practical arrangement of the circuit shown in FIG. 8.

For example, from the above description of the relationships between the numbers in the matrix 100, persons skilled in the art will realise that the circuit shown in FIG. 8 can be simplified, since in practice a number of bits within the registers remain constant throughout the process of generating dither values. Such a simplified arrangement is shown in FIG. 14, and can be used for generating dither values across the matrix 100, starting at the first column, first row. The "missing" register bits are provided merely by hard-wiring to logic '0' or '1' as appropriate.

Both of the implementations described with respect to FIG. 8 and FIG. 14 could be provided at the interface between the computer 2 and frame buffer 10 (FIG. 3), rather than within the computer 2 itself as part of the renderer 52.

Other implementations are also possible. An implementation which uses registers of a general purpose 32-bit microprocessor, and which processes the numbers therein in parallel will now be described.

Figure 15:
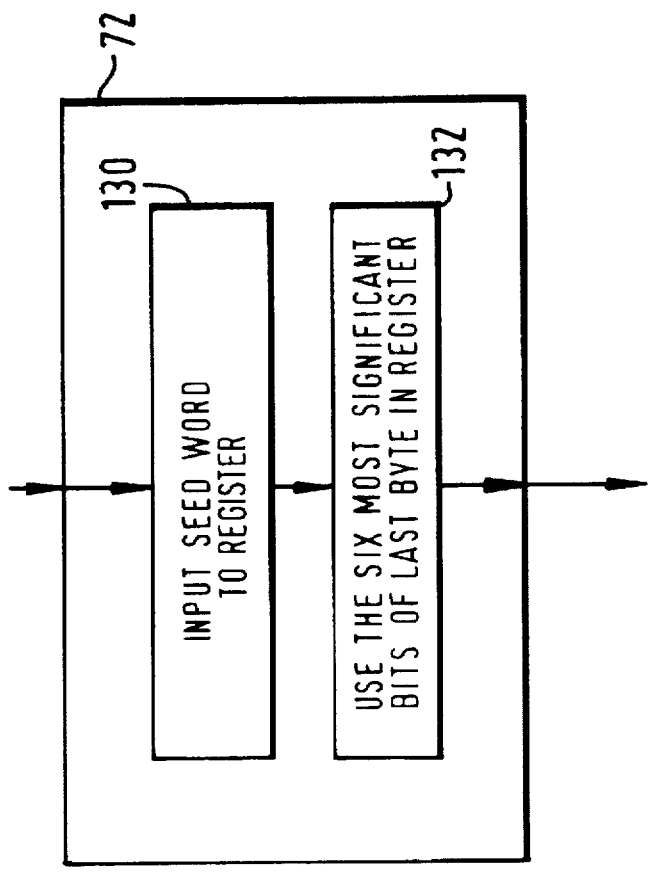
FIG. 15 shows the steps by which the first dither value for a given line is generated at step 72 in the process of FIG. 4 in a second implementation of an embodiment of the invention.

FIG. 15 shows the way in which such an implementation may be used to generate the first dither value for a given line at step 72 in the process of FIG. 4. At step 130 the seed word for the line is input, for example from memory 6, to a register 30 within the central processing unit 4 (FIG. 2). By way of example, the first input seed may be that for generating the values from the first column in the first row of the dither matrix 100, and accordingly the seed 0-2-0-8-32-0 (given in FIG. 13) is input.

Figure 16:
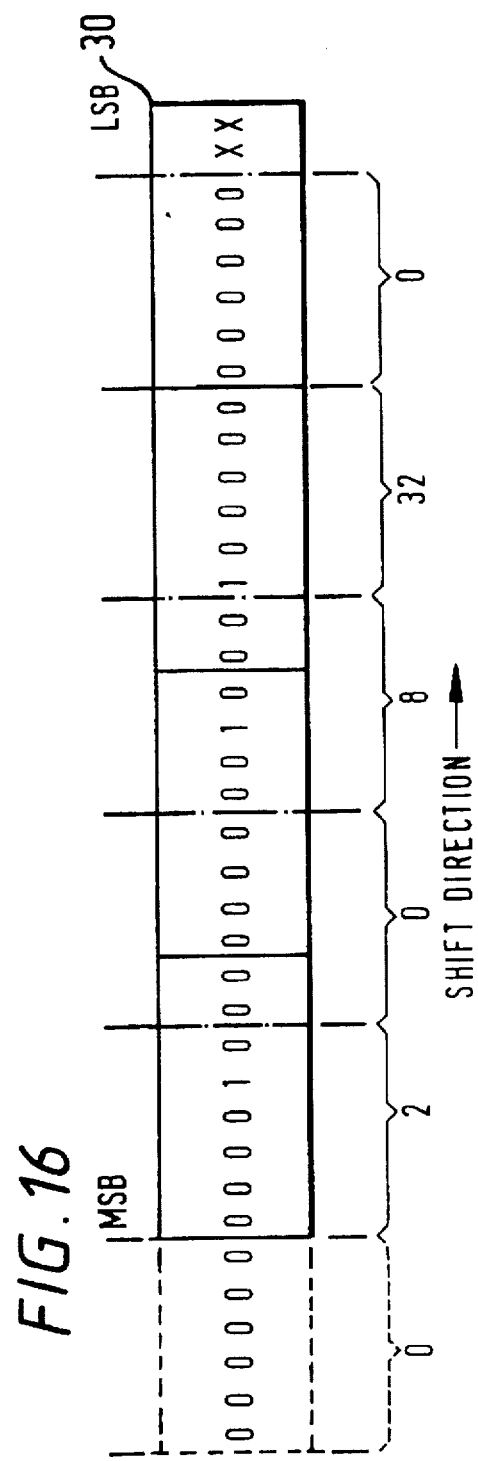
FIG. 16 illustrates the storage of the seed within a register of a microprocessor in an embodiment of the invention.

The seed is stored within the microprocessor register 30 as illustrated in FIG. 16. Each number in the seed is stored as a six-bit binary number. However, the register 30 in a popular microprocessor (Intel 80386, 80486 etc, Motorola 68030 etc) has a storage capacity of 32 bits, while 36 bits are required to store in full the seed for the 8×8 Bayer matrix used in the present embodiment. This problem is overcome by utilising the mathematical properties of the seed. In FIG. 16, the solid lines indicate the boundaries of each byte (8 bits) within the register 30 and the chain lines indicate the boundaries of each seed number (6 bits). The last five numbers of the seed (in the example shown, 2, 0, 8, 32 and 0) are stored in full, while the first number (0) is not stored.

This method of storage is possible since the first number of every seed that it is desired to input is always 0 (FIG. 13) and because, in the instruction set of the microprocessor, the effect of a subsequent shift operation in the register 30 is typically to introduce a corresponding number of 0s into the register from the left hand side (indicated by the dotted lines at the left-hand side of FIG. 16), which is the desired effect. The two bits in the two least-significant bit places (right-hand side) of the register 30 (represented as "XX" in FIG. 16) are not part of the seed word, and are ignored when the dither values are generated. Thus, at step 132 in FIG. 15, the six most-significant bits of the last byte in the register 30 are used as the required first dither value, and the two least-significant bits are ignored.

Figure 17:
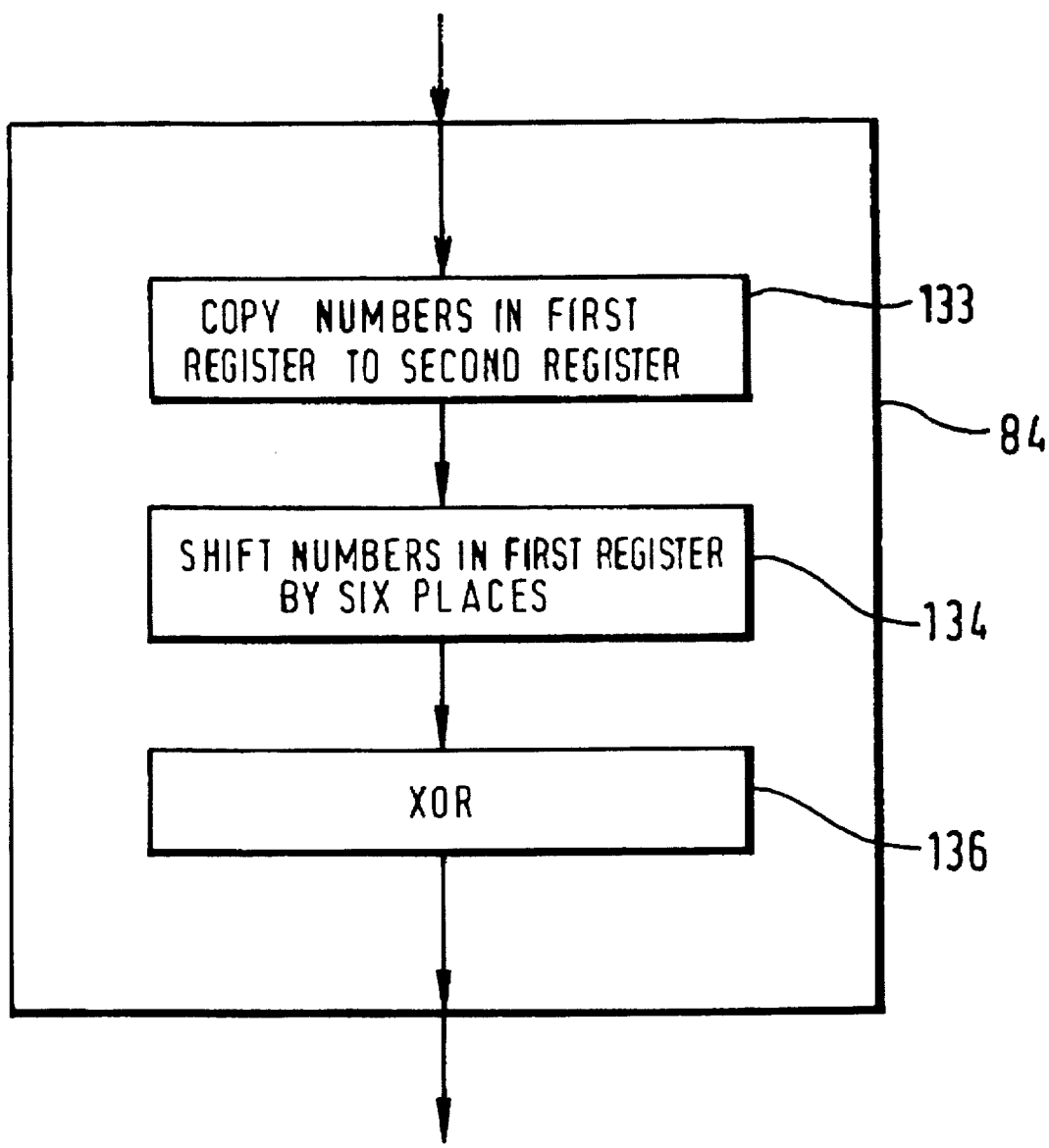
FIG. 17 shows the steps in which subsequent dither values for a given line are generated at step 84 in the process of FIG. 4 in the second implementation of an embodiment of the invention.

FIG. 17 shows the way in which a subsequent dither value for a given line is generated at step 84 in the process of FIG. 4. At step 133, the seed used in the register 30 is copied to a second register within the CPU 4. At step 134, the seed word in the first register 30 is shifted right by six bit places (that is, the length of one number in the seed). At step 136, an XOR operation is performed between the shifted and unshifted numbers (that is, the numbers in the two registers), with the result being written back into the first register 30. At this point, the six most-significant bits in the last byte of the first register 30 constitute the next dither value. Repetition of steps 133, 134 and 136 generates subsequent dither values. This process is illustrated in FIG. 18 for the seed 0-2-0-8-32-0, this Figure showing the equivalent steps to those illustrated in FIG. 12 for the first implementation.

Accordingly, to generate dither values in this implementation, the steps S14 and S16 of FIG. 11 are effectively performed by program controlled operations.

As will be apparent to the person skilled in the art, although in the above example the first seed to be input is the seed corresponding to the first row in the dither matrix 100, this need not be the case. For example, it is possible to generate the matrix 100 starting at any desired row and/or column position. Thus, for example, it is possible to generate the values of row 1 of the matrix 100 in the order 40, 2, 34, 10, 42, 0, 32, 8 by inputting as the seed the number V23 (0) in FIG. 10E, the number V24 (2) in FIG. 10D, the number V25 (2) in FIG. 10C, the number V26 (10) in FIG. 10B, the number V27 (42) in FIG. 10A and the number V28 (40) in FIG. 6. The required seed is determined on the basis of the coordinates within the display of the first pixel to undergo dithering, which are read at step 70 (FIG. 4), so that a run of pixels can be written with dithering at any location in the frame store.

In the example above, dither values were generated for rows of pixels, with a given seed being used for each row. However, as will be readily apparent to persons skilled in the art, dither values can also be generated for columns of pixels in the same manner. For example, consideration will show that the seed 0-3-0-12-48-0 (derived by producing difference tables corresponding to those shown in FIGS. 10A to 10E for adjacent vertical values) will generate the dither values 0-48-12-60-3-51-5-63, corresponding to the first column of the matrix 100 shown in FIG. 6.

In addition, although in the example above, a new seed was input for each row (or column) of display pixels, persons skilled in the art will realise from the above description that it is possible to derive a new seed from the seed of the preceding row (or column). This has particular application where every pixel in a display is to be subjected to dithering. For example, consideration of FIG. 13 will show that only one number in the seed (namely the last number for a starting position of the first column) changes between rows, and that this number takes values corresponding to those in the first column of the matrix 100. Accordingly, one way of deriving a seed from the seed of the preceding row is to employ a further register within the central processing unit 4. The first register receives the row seed for the starting position (0-2-0-8-32-0 for the first column, first row), while the further register receives the column seed for the starting position (0-3-0-12-48-0) for the first column, first row). On requiring a new seed for the next row, the operations SHIFT, XOR and READ and performed on the numbers in the further register, as described previously, thereby generating the new number for the seed. Accordingly, the seed for the next line can be obtained by using the seed for the previous line but replacing the changing number (i.e. the last byte in FIG. 16) with the new number generated in the further register.

By way of a second example, the way in which the process of using dithering more generally to reduce multilevel colour data to colour display data of fewer levels is performed in the present embodiment will now be described.

Figure 19:
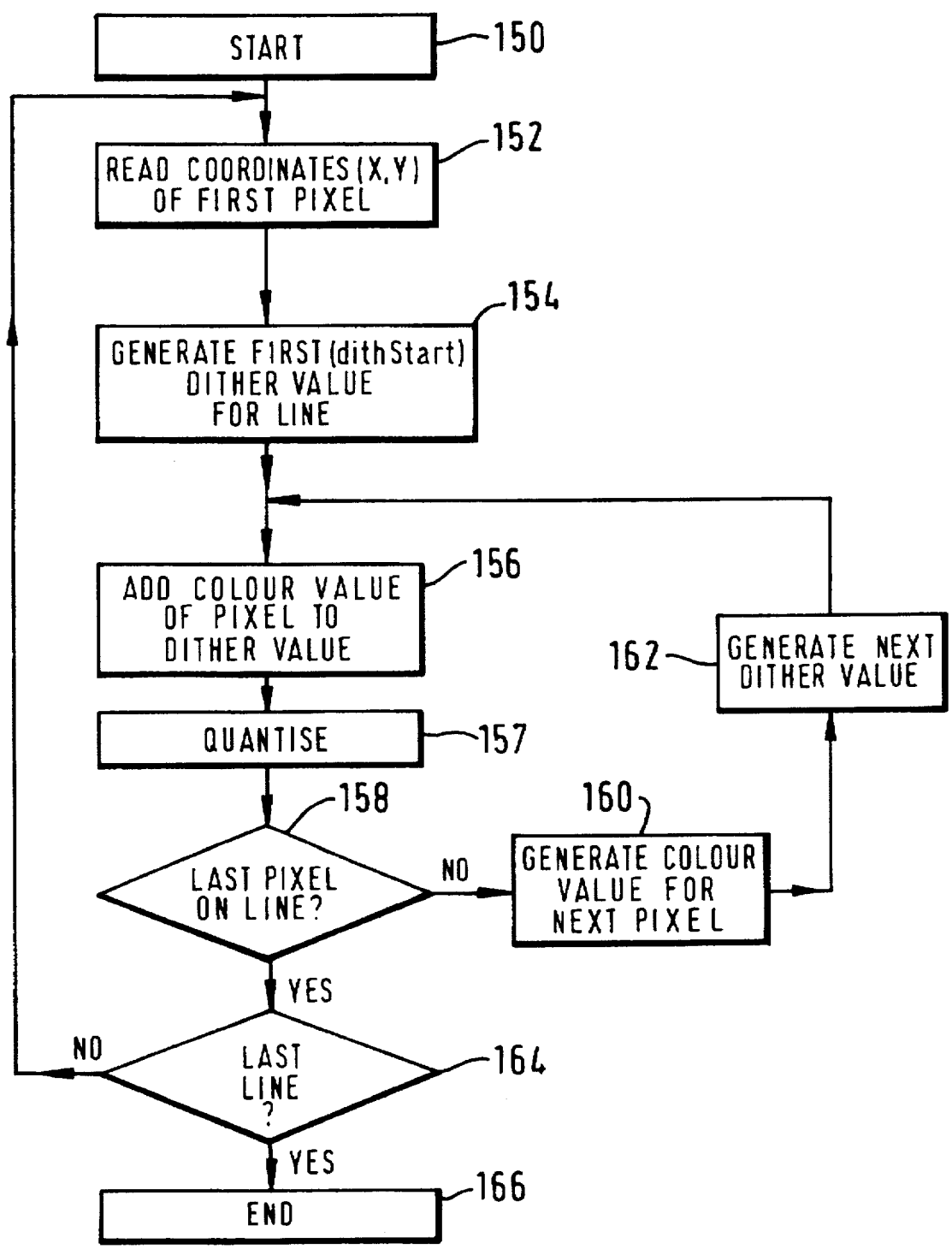
FIG. 19 shows the steps by which the process of using dithering to reduce multi-level colour data to data having less levels for display, is performed in an embodiment of the invention.

The following equations are referred to in relation to the description of FIG. 19 that follows.

Equation 1 dithStart=(dithDown [Y&7]&ff) ^ dithAcross [X&7]

| Equation 2 | Equation 3 |
|---|---|
| dithAcross [0] = 08022002 | dithDown [0] = 0c033003 |
| dithAcross [1] = 08222882 | dithDown [1] = 0c333cc3 |
| dithAcross [2] = 0802a020 | dithDown [2] = 0c03f030 |
| dithAcross [3] = 0822aaa0 | dithDown [3] = 0c33ff0 |
| dithAcross [4] = 0802200a | dithDown [4] = 0c03300f |
| dithAcross [5] = 0822288a | dithDown [5] = 0c333ccf |
| dithAcross [6] = 0802a028 | dithDown [6] = 0c03f03c |
| dithAcross [7] = 0822aaa8 | dithDown [7] = 0c033ffc |

Equation 4 pixel_colour=(((dithvalue & ff)+colourvalue)>>8)& ff

Equation 5 dithvalue=(dithvalue>>6)

FIG. 19 shows the overall steps in this process. At step 152, the renderer 52 reads the coordinates of the first pixel in the image area which is to be subjected to the dithering operation. At step 154, the first dither value is generated within the central processing unit 4, and at step 156, the colour value of the pixel and the dither value are added, with the resultant value being quantised at step 157 and written to frame buffer 10. At step 158, a check is made to determine whether the pixel just processed is the last pixel to be subjected to the dithering process on a display line. If the pixel is not the last pixel, the colour value for the next pixel is generated at step 160, and the next dither value is generated at step 162. The process then returns to step 156, where the colour value and the dither value are added.

Steps 156 to 162 are repeated until it is determined at step 158 that the pixel just processed is the last pixel to be subjected to dithering on a given display line. In this case, the process then proceeds to step 164, in which it is determined whether a line of pixels just processed is the last line in the area of the display to be subjected to the dithering process. If the line is the last line, then the process ends at step 166. If the line is not the last line, the process returns to step 152, where the coordinates of the first pixel to be subjected to dithering on the next line are read.

Steps 152 to 164 are repeated until all the lines in the area to be subjected to dithering have been processed. The steps can be repeated for each additional area to be rendered.

The way in which steps 154,156,160 and 162 are performed in the present embodiment will now be described in greater detail.

In step 154, the first dither value for the line (dithStart) is generated by the central processing unit 4 using equation 1. In this equation, the symbol "&" indicates a bitwise AND operation, the symbol "^" indicates a bitwise XOR operation, "ff" is hexadecimal notation for the binary number 11111111 and the variables dithDown[Y&7] and dithAcross[X&7] are pre-stored in memory 6, with the appropriate values being read by the central processing unit 4 in dependence upon the coordinates (X,Y) of the first pixel read at step 152. More specifically, the central processing unit 4 reads values of dithDown and dithAcross from memory 6 in dependence upon the results of the operations Y AND 7 and X AND 7, respectively, where both X and Y are integer values from 0 to 7 depending upon the position of the pixel within an 8×8 dither matrix laid down on the pixels as shown in, and described before with respect to, FIG. 7. Thus, for example, the value of (X,Y) would be (0,0) if the pixel was in the first column, first row of a dither matrix, while the value would be (6,5) if the pixel was in the seventh column, sixth row of the matrix.

The values of dithAcross[0] to dithAcross[7] which are stored in memory 6 are shown in equation 2, and the values of dithDown[0] to dithDown[7] which are stored in memory 6 are shown in equation 3. In equations 2 and 3, the standard hexadecimal notation is used, that is with "0" to "9" representing the 4-bit binary numbers 0000 to 1001, "a" representing the binary number 1010, "b" representing the binary number 1011, "c" representing 1100, "d" representing 1101, "e" representing 1110, and "f" representing 1111.

Inspection of equation 1, 2 and 3 reveals equation 1 generates the same initial seed words as described previously with respect to the first example. As in the CPU register implementation of the first example, a seed word occupies the 30 most-significant-bit places in a register 30, with the two digits in the 2 least-significant-bit places (represented in the first example as "XX" in FIG. 16) not being part of the seed.

By generating the first dither value for a line as described above, it is not necessary to store all of the initial seed words (that is, sixty-four words, being one for each pixel in the 8×8 matrix) in memory 6. Instead, a reduced number of words may be stored (16 words in this example).

In steps 156 and 157 of FIG. 19, the original many-level colour value of the pixel and the dither value are added together and quantised to generate an output value, using equation 4, this value then being written to frame buffer 10 as the desired pixel display value.

The combined addition and quantisation operation using equation 4 will now be described further.

In the present embodiment, the original pixel value (colourvalue) is a 16 bit word, with bits 8 to 15 representing the integer part of the number, and bits 0 to 7 representing the fractional part of the number. The desired dither value is a six bit number, but is stored only as part of the entire seed word dithvalue in register 30, as described above with respect to FIG. 16. Therefore, in equation 4, only the last eight bits in register 30 are added to the fractional part of colourvalue, by masking with "ff". It will be apparent that the last two bits on the right-hand side of register 30 (represented as "XX" in FIG. 16) are added to colourvalue as well as the desired dithervalue. However, this has no deterimental effect on the result because the two bits XX are the least-significant in the 8 bits added to colourvalue, and will have little or no effect on the displayed result. It would be possible to mask the two unwanted bits by masking with "fc", although it is more efficient to work with full bytes as described above.

The operation ">>8" in equation 4 has the effect of shifting the sum of dithvalue and colourvalue by 8 places. That is, the operation has the effect of quantising the value by discarding the fractional part of the sum. The remaining integer part of the sum is the desired 8-bit value for the pixel on the display, having been changed, or not, from its initial value depending upon that initial value and the dither value added.

In step 160 of the process shown in FIG. 19, the original colour value for the next pixel is generated. In the present embodiment, this is done by adding a colour interpolation value to the colour value of the previous pixel. The colour interpolation or "delta" value can be derived using one of a number of techniques which are well known to those skilled in the art, for example, a Gouraud shading technique. Of course, the original colour values can be derived by more complex calculations, as in Phong shading, by table look-up (texture mapping), and so on.

The steps by which the next dither value is generated at step 162 in FIG. 19 are the same as those shown in FIG. 17. Namely, the numbers in the first register 30 are copied temporarily to a second register and then shifted by six places (that is, the length of one number in the seed) within the first register. A bitwise XOR operation is performed on the numbers in the two registers, as previously illustrated in FIG. 18. This is shown by equation 5.

The invention is applicable to dithering techniques other than those described above. For example, the invention may be used when dithering between four colour values, as described in WO 91/18382.

In the previous embodiments, the invention has been described with respect to the well-known Bayer matrix. However, the invention is not limited to this particular matrix or to this type of matrix.

For example, the invention may be used to produce the numbers in the matrices given in FIGS. 20 to 22.

Inspection will reveal that the matrix of FIG. 20 comprises a sequence of 64 numbers, each giving the position in the Bayer matrix of a respective threshold value. For example, the second entry in the FIG. 20 matrix is the number 36, while the second lowest threshold level in the Bayer matrix is in the thirty-sixth position. The FIG. 20 matrix may therefore be useful in methods where it is desired to identify specific pixels to be turned on within a dither area. The FIG. 21 matrix is similarly derived, but relates to the odd-numbered and even numbered pixels of the Bayer matrix separately. It can be more efficient to generate the odd and even numbered pixel values separately, for example, in Windows (TM)-compatible systems when 4-bit pixel values are to be packed pair-wise into 8-bit bytes. The FIG. 22 matrix is another matrix widely used, for example in U.S. Pat. No. 5341464.

Inspection will reveal that the numbers in the first row of each matrix can be generated using the following seed words:

FIG. 20 : 0-18-0-4-36-0
FIG. 21: 0-17-0-2-34-0
FIG. 22: 0-9-6-0

The numbers in other rows (or columns) can be generated from other seeds, derived for example as described previously.

By inputting the seed to a register 30 within the central processing unit 4 and performing mathematical operations on the numbers in the seed, such as the XOR and shift operations in the embodiment above, the time taken to perform the dithering operation is reduced. In particular, the dither matrix values are readily available to the central processing unit 4 locally, and there is no requirement to fetch the values from external memory. In addition, the generation of the matrix values in the register 30 by shift and XOR is exceptionally quick.

It will be appreciated that further modifications and alterations might be made by those skilled in the art without departing from the spirit and scope of the invention.

What is claimed is:

1. A method of operating an image-data processing apparatus having a central processing unit comprising at least one register and an arithmetic logic unit for carrying out operations on data in the register, the method comprising:
   inputting data in the form of a seed word into said register, and
   causing the central processing unit to perform predefined operations on said data in the register, so as to generate a succession of different pixel reference values for use in one of a dithering operation and a halftoning operation on image data, said succession of pixel reference values including values not contained within said seed word.

2. A method according to claim 1, wherein said predefined operations comprise operations to combine parts of said data in the register.

3. A method according to claim 1, wherein said predefined operations include performing a shift operation on said data to generate shifted data.

4. A method according to claim 1, wherein said predefined operations include a Boolean operation.

5. A method according to claim 3, wherein said predefined operations further include performing an exclusive-OR operation on (i) said data in the register and (ii) said shifted data.

6. A method according to claim 1, wherein said pixel reference values comprise values from a matrix defined by at least one recurrence relationship.

7. A method according to claim 6, wherein said matrix is a Bayer matrix.

8. A method according to claim 1, wherein said image data comprises pixel data defining an image, each pixel having a position within the image, and wherein said seed word is selected in dependence upon the position within the image of the first pixel in a given area of the image to be subjected to said one of a dithering operation and a halftoning operation.

9. A method according to claim 8, wherein said data is input to said register by reading the seed word from a memory.

10. A method according to claim 9, wherein said pixel reference values comprise values from one of a dither matrix and a halftoning matrix having m values in a row and n values in a column, and wherein there are stored in said memory m×n seed words.

11. A method according to claim 8, wherein said seed word is calculated from initial numbers prestored in a memory.

12. A method according to claim 11, wherein said pixel reference values comprise values from one of a dither matrix and a halftoning matrix having m values in a row and n values in a column, and wherein there are prestored in said memory m+n initial numbers.

13. A method according to claim 8, wherein a new seed word is used for each row of pixels, and wherein each new seed word is input to said register by reading from a memory.

14. A method according to claim 8, wherein a new seed word is used for each row of pixels, and wherein each new seed word is derived from a previous seed word.

15. A method according to claim 3, wherein said register has a capacity of 32 bit locations, and wherein said shift operation comprises a shift of six bit places.

16. A method according to claim 3, wherein said register has a capacity of 32 bit locations, wherein said seed word is input so as to fill 30 consecutive bit locations leaving 2 bit locations at one end of said register, and wherein said shift operation comprises a shift of six bit places towards said one end of said register.

17. A method according to claim 1, further comprising the steps of obtaining a succession of pixel values and quantising said pixel values in dependence upon respective ones of said succession of pixel reference values, and outputting the quantised pixel values as output image data.

18. A method according to claim 17, wherein after obtaining one pixel value of said succession, further pixel values of said succession are obtained by calculation entirely within said central processing unit.

19. A method according to claim 1 wherein said reference values determine a pixel position for writing a pixel value.

20. A method according to claim 1, wherein the step of inputting said data comprises reading first and second partial seed words from a memory, and combining the first and second partial seed words in accordance with a pixel position.

21. A method of generating reference values for use in one of a dithering operation and a halftoning operation, said method comprising inputting numbers to an u-bit register within a central processing unit of an image processing apparatus, and operating the central processing unit so as to manipulate said numbers to generate v mutually different w-bit reference values, where v×w is greater than u.

22. A method according to claim 21, wherein the step of operating the central processing unit so as to manipulate said numbers causes the central processing unit to perform operations to combine said numbers.

23. A method according to claim 21, wherein the step of operating the central processing unit so as to manipulate said numbers causes the central processing unit to perform a shift operation on said numbers to produce shifted numbers.

24. A method according to claim 21, wherein the step of operating the central processing unit so as to manipulate said numbers causes the central processing unit to perform Boolean operations on said numbers.

25. A method according to claim 23, wherein the step of operating the central processing unit so as to manipulate said numbers further causes the central processing unit to perform an exclusive-OR operation on (i) said numbers and (ii) said shifted numbers.

26. A method according to claim 21, wherein said reference values comprise values from a matrix defined by at least one recurrence relationship.

27. A method according to claim 26, wherein said matrix is a Bayer matrix.

28. A method according to claim 21, further comprising the steps of obtaining a succession of pixel values and quantising said pixel values in dependence upon respective ones of said succession of pixel reference values, and outputting the quantised pixel values as output image data.

29. A method according to claim 21, wherein said reference values determine a pixel position for writing a pixel value.

30. A method of operating an image processing apparatus to generate a succession of pixel reference values for use in one of a dithering operation and a halftoning operation, the method comprising:
(a) loading an initial seed word into a processing circuit; and
(b) operating said processing circuit so as to generate said succession of pixel reference values using a succession of seed words, starting from the initial seed word, each successive seed word being calculated from the preceding seed word.

31. A method according to claim 30, wherein each successive seed word is calculated by combining parts of the preceding seed word.

32. A method according to claim 30, wherein said succession of pixel reference values form part of a repetitive sequence, and wherein each said seed word is shorter than said sequence.

33. A method according to claim 32, wherein step (a) comprises inputting said initial seed word to a plurality of registers, said registers having a total of u bit-places therein, and said sequence of reference values comprises v mutually different w-bit reference values, where v×w is greater than u.

34. A method according to claim 31, wherein each said seed word comprises a series of numbers and wherein the step of combining parts of the seed word comprises combining each of said numbers with an adjacent one of said numbers.

35. A method according to claim 31, wherein said parts are combined by an exclusive-OR (XOR) operation.

36. A method according to claim 30, wherein certain parts of said seed word are not variable, and said certain parts are not explicitly loaded into said processing circuit in step (a).

37. An image-data processing apparatus, comprising:
a central processing unit having at least one register and an arithmetic logic unit for carrying out operations on data in the register;
input means for inputting data in the form of a seed word into said register; and
means for causing the central processing unit to perform predefined operations on said data in the register, so as to generate a succession of different pixel reference values for use in one of a dithering operation and a halftoning operation on image data, said succession of pixel reference values including values not contained within said seed word.

38. Apparatus according to claim 37, wherein said predefined operations comprise operations to combine parts of said data in the register.

39. Apparatus according to claim 37, wherein said predefined operations include performing a shift operation on said data to generate shifted data.

40. Apparatus according to claim 37, wherein said predefined operations include a Boolean operation.

41. Apparatus according to claim 39, wherein said predefined operations further include performing an exclusive-OR operation on (i) said data in the register and (ii) said shifted data.

42. Apparatus according to claim 37, wherein said pixel reference values comprise values from a matrix defined by at least one recurrence relationship.

43. Apparatus according to claim 42, wherein said matrix is a Bayer matrix.

44. Apparatus according to claim 37, wherein said image data comprises pixel data defining an image, each pixel having a position within the image, and wherein said apparatus further comprises means for selecting said seed word in dependence upon the position within the image of the first pixel in a given area of the image to be subjected to said one of a dithering operation and a halftoning operation.

45. Apparatus according to claim 44, wherein said input means comprises means for inputting said data to said register by reading the seed word from a memory.

46. Apparatus according to claim 45, wherein said pixel reference values comprise values from one of a dither matrix and a halftoning matrix having m values in a row and n values in a column, and wherein there are stored in said memory m×n seed words.

47. Apparatus according to claim 44, wherein said input means comprises means for calculating said seed word from initial numbers prestored in a memory.

48. Apparatus according to claim 47, wherein said pixel reference values comprise values from one of a dither matrix and a halftoning matrix having m values in a row and n values in a column, and wherein there are prestored in said memory m+n initial numbers.

49. Apparatus according to claim 44, wherein a new seed word is used for each row of pixels, and wherein said input means comprises means for inputting each new seed word to said register by reading from a memory.

50. Apparatus according to claim 44, wherein a new seed word is used for each row of pixels, and wherein said input means comprises means for deriving each new seed word from a previous seed word.

51. Apparatus according to claim 39, wherein said register has a capacity of 32 bit locations, and wherein said shift operation comprises a shift of six bit places.

52. Apparatus according to claim 39, wherein said register has a capacity of 32 bit locations, wherein said input means inputs said seed word so as to fill 30 consecutive bit locations leaving 2 bit locations at one end of said register, and wherein said shift operation comprises a shift of six bit places towards said one end of said register.

53. Apparatus according to claim 37 further comprising:
means for obtaining a succession of pixel values;
means for quantising said pixel values in dependence upon respective ones of said succession of pixel reference values; and
means for outputting the quantised pixel values as output image data.

54. Apparatus according to claim 53, wherein after obtaining one pixel value of said succession, said means for obtaining a succession of pixel values obtains further pixel values of said succession by calculation entirely within said central processing unit.

55. Apparatus according to claim 37, wherein said reference values determine a pixel position for writing a pixel value.

56. Apparatus according to claim 37, wherein said input means comprises means for reading first and second partial seed word from a memory, and means for combining the first and second partial seed words in accordance with a pixel position.

57. Image processing apparatus for generating reference values for use in one of a dithering operation and a halftoning operation, comprising:
a central processing unit having a u-bit register;
input means for inputting numbers to said u-bit register; and
operating means for operating the central processing unit so as to manipulate said numbers to generate v mutually different w-bit reference values, where v×w is greater than u.

58. Apparatus according to claim 57, wherein said operating means operates the central processing unit so as to combine said numbers.

59. Apparatus according to claim 57, wherein said operating means operates the central processing unit so as to perform a shift operation on the numbers to produce shifted numbers.

60. Apparatus according to claim 57, wherein said operating means operates the central processing unit so as to perform Boolean operations on said numbers.

61. Apparatus according to claim 59, wherein said operating means further operates the central processing unit so as to perform an exclusive-OR operation on (i) said numbers and (ii) said shifted numbers.

62. Apparatus according to claim 57, wherein said reference values comprise values from a matrix defined by at least one recurrence relationship.

63. Apparatus according to claim 62, wherein said matrix is a Bayer matrix.

64. Apparatus according to claim 57, further comprising:
means for obtaining a succession of pixel values;
means for quantising said pixel values in dependence upon respective ones of said succession of pixel reference values; and
means for outputting the quantised pixel values as output image data.

65. Apparatus according to claim 57, wherein said reference values determine a pixel position for writing a pixel value.

66. Image processing apparatus for generating a succession of pixel reference values for use in one of a dithering operation and a halftoning operation, comprising:
(a) a memory for an initial seed word; and
(b) a processor for generating said succession of pixel reference values using a succession of seed words, starting from the initial seed word, each successive seed word being calculated from the preceding seed word.

67. Apparatus according to claim 66, wherein said processor calculates each successive seed word by combining parts of the preceding seed word.

68. Apparatus according to claim 66, wherein said succession of pixel reference values form part of a repetitive sequence, and wherein each said seed word is shorter than said sequence.

69. Apparatus according to claim 68, wherein said memory comprises a plurality of registers, said registers having a total of u bit-places therein, and said sequence of reference values comprises v mutually different w-bit reference values, where v×w is greater than u.

70. Apparatus according to claim 67, wherein each said seed word comprises a series of numbers and wherein the processor combines each of said numbers with an adjacent one of said numbers.

71. Apparatus according to claim 67, wherein said processor combines said parts by an exclusive-OR (XOR) operation.

72. Apparatus according to claim 66, wherein certain parts of said seed word are not variable, and said certain parts are not explicitly loaded into said memory.

73. A record carrier wherein there is embodied a program for causing an image processing apparatus to perform a method according to any of claims 1 to 36.

74. A signal conveying a program for causing an image processing apparatus to perform a method according to any of claims 1 to 36.

* * * * *

UNITED STATES PATENT AND TRADEMARK OFFICE
CERTIFICATE OF CORRECTION

PATENT NO. : 5,714,975

DATED : February 3, 1998

INVENTOR(S) : JOHN NEIL SPACKMAN

It is certified that error appears in the above-identified patent and that said Letters Patent is hereby corrected as shown below:

COLUMN 3

Line 27, "FIG. 5A,5B" should read --FIGS. 5A, 5B--; and
    Line 39, "FIG. 10A to" should read --FIGS. 10A to 10E--.

COLUMN 5

Line 64, "two dimensional" should read --two-dimensional--.

COLUMN 6

Line 13, "three dimensional" should read --three-dimensional-- and "two dimensional" should read --two-dimensional--;
    Line 15, "two dimensional" should read --two-dimensional--; and
    Line 41, "value" should read --value,--.

COLUMN 8

Line 44, "Steps S14,S16" should read --Steps S14, S16--.

COLUMN 9

Line 26, "20(8)" should read --V20(8)--.

COLUMN 10

Line 13, "left hand" should read --left-hand--.

UNITED STATES PATENT AND TRADEMARK OFFICE
CERTIFICATE OF CORRECTION

PATENT NO. : 5,714,975
DATED : February 3, 1998
INVENTOR(S) : JOHN NEIL SPACKMAN Page 2 of 3

It is certified that error appears in the above-identified patent and that said Letters Patent is hereby corrected as shown below:

COLUMN 11

Line 50, "dithvalue=(dithvalue>>6)" should read --dithvalue^=(dithvalue>>6)--.

COLUMN 12

Line 15, "(dithStart)" should read --(dithStart)--;
Line 20, "dithDown[Y&7]" should read --dithDown[Y&7]--;
Line 21, "dithAcross[X&7]" should read --dithAcross[X&7]--
Line 25, "dithDown and dithAcross" should read --dithDown and dithAcross--;
Line 35, "dithAcross[0] to dithAcross[7]" should read --dithAcross[0] to dithAcross[7]--;
Line 37, "dithDown[0] to dithDown[7]" should read --dithDown[0] to dithDown[7]--;
Line 44, "equation 1," should read --equations 1,--; and
Line 66, "(colourvalue)" should read --(colourvalue)--.

COLUMN 13

Line 3, "dithvalue" should read --dithvalue--;
Line 6, "colourvalue," should read --colourvalue,--;
Line 8, "colourvalue" should read --colourvalue--;
Line 10, "colourvalue," should read --colourvalue,--;
Line 16, "dithvalue and colourvalue" should read --dithvalue and colourvalue--;
Line 61, "even numbered" should read --even-numbered--;
Line 63, "odd and even numbered" should read --odd- and even-numbered--;
Line 67, "No. 5341464." should read --No. 5,341,464.--.

UNITED STATES PATENT AND TRADEMARK OFFICE
CERTIFICATE OF CORRECTION

PATENT NO. : 5,714,975

DATED : February 3, 1998

INVENTOR(S) : JOHN NEIL SPACKMAN

It is certified that error appears in the above-identified patent and that said Letters Patent is hereby corrected as shown below:

COLUMN 15

Line 21, "30" should read --30--; and
    Line 33, "claim 1" should read --claim 1,--.

COLUMN 17

Line 57, "word" should read --words--.

Signed and Sealed this

Eighth Day of September, 1998

Attest:

BRUCE LEHMAN

Attesting Officer    Commissioner of Patents and Trademarks